(12) United States Patent
Gysling

(10) Patent No.: US 12,130,301 B2
(45) Date of Patent: Oct. 29, 2024

(54) METHOD TO DETERMINE CHARACTERISTICS OF A BUBBLY MIXTURE USING A CORIOLIS METER UTILIZING A MEASURE OF THE DRIVE GAIN

(71) Applicant: Corvera, LLC, South Glastonbury, CT (US)

(72) Inventor: Daniel Gysling, South Glastonbury, CT (US)

(*) Notice: Subject to any disclaimer, the term of this patent is extended or adjusted under 35 U.S.C. 154(b) by 0 days.

(21) Appl. No.: 18/292,914

(22) PCT Filed: Apr. 24, 2023

(86) PCT No.: PCT/US2023/066127
§ 371 (c)(1),
(2) Date: Jan. 28, 2024

(87) PCT Pub. No.: WO2023/212527
PCT Pub. Date: Nov. 2, 2023

(65) Prior Publication Data
US 2024/0280453 A1 Aug. 22, 2024

Related U.S. Application Data

(60) Provisional application No. 63/380,284, filed on Oct. 20, 2022, provisional application No. 63/375,102, (Continued)

(51) Int. Cl.
*G01N 9/32* (2006.01)
*G01F 1/84* (2006.01)

(52) U.S. Cl.
CPC ............... *G01N 9/32* (2013.01); *G01F 1/84* (2013.01)

(58) Field of Classification Search
CPC .... G01F 1/8477; G01F 1/8422; G01F 1/8431; G01F 1/849; G01F 1/74; G01F 1/84; G01F 25/10; G01N 9/32
See application file for complete search history.

(56) References Cited

U.S. PATENT DOCUMENTS

| 5,600,073 A | 2/1997 | Hill |
| 7,152,460 B2 | 12/2006 | Gysling |

(Continued)

FOREIGN PATENT DOCUMENTS

| WO | 2017108280 A1 | 6/2017 |
| WO | 2021086401 A1 | 5/2021 |

*Primary Examiner* — John Fitzgerald
*Assistant Examiner* — Truong D Phan
(74) *Attorney, Agent, or Firm* — Matthew J Patterson

(57) ABSTRACT

A method is disclosed that may include measuring a measured fluid density of a process fluid using a vibrational frequency of a fluid-conveying flow tube of the Coriolis meter where a density of a liquid phase of the process fluid is unknown. In addition, the method may include measuring at least one of an excitation energy metric of the Coriolis meter and a vibrational amplitude metric of the Coriolis meter. The method may include determining a Coriolis Mass Flowmeter Damping (CMFD) parameter using at least one of the excitation energy metric and the vibrational amplitude metric. Moreover, the method may include determining the density of the liquid phase of the process fluid using the measured fluid density and the CMFD parameter. Systems employing such methods are further disclosed.

20 Claims, 13 Drawing Sheets

Related U.S. Application Data filed on Sep. 9, 2022, provisional application No. 63/334,168, filed on Apr. 24, 2022.

(56) References Cited

U.S. PATENT DOCUMENTS

| | | |
|---|---|---|
| 7,406,878 B2 | 8/2008 | Rieder |
| 7,412,903 B2 | 8/2008 | Rieder |
| 7,793,555 B2 | 9/2010 | Gysling |
| 8,289,179 B2 * | 10/2012 | Weinstein ............. G01F 1/8436 |
| | | 702/56 |
| 8,302,489 B2 | 11/2012 | Bell |
| 2003/0154036 A1 | 8/2003 | Gysling |
| 2005/0044929 A1 * | 3/2005 | Gysling ................ G01F 1/8477 |
| | | 73/32 A |
| 2005/0081643 A1 | 4/2005 | Mattar |
| 2008/0053240 A1 | 3/2008 | Henry |
| 2011/0023625 A1 * | 2/2011 | Weinstein ................ G01F 1/74 |
| | | 73/861.357 |
| 2019/0154486 A1 | 5/2019 | Zhu |
| 2021/0172782 A1 * | 6/2021 | Gysling ................ G01F 1/8477 |
| 2022/0307960 A1 | 9/2022 | Gysling |

* cited by examiner

METHOD TO DETERMINE CHARACTERISTICS OF A BUBBLY MIXTURE USING A CORIOLIS METER UTILIZING A MEASURE OF THE DRIVE GAIN

CROSS REFERENCE TO RELATED APPLICATIONS

This application claims the benefit of U.S. Provisional Patent Application Ser. No. 63/334,168 filed Apr. 24, 2022, U.S. Provisional Application Ser. No. 63/375,102 filed Sep. 9, 2022, U.S. Provisional Patent Application Ser. No. 63/380,284 filed Oct. 20, 2022, as well as Patent Cooperation Treaty Patent Application Serial No. PCT/US23/66127 filed on Apr. 24, 2023. The disclosures of the applications above are incorporated herein by reference in their entirety.

BACKGROUND OF THE DISCLOSURE

Field of the Disclosure

The present disclosure presents methods to quantify and mitigate measurement errors that develop in Coriolis meters operating on bubbly flows.

Description of the Related Art

Coriolis meters as defined herein are low measurement devices that measure the mass flow and/or density of a process fluid being conveyed through one or more vibrating flow tubes based on interpreting the effect of said process fluid on the vibrational characteristics of said flow tubes. The accuracy of both the mass flow rate and density reported by Coriolis which were calibrated on single phase flows, but operating on bubbly liquids is well-known to degrade. Note that Coriolis meters do not directly measure the volumetric flow rate of a process fluid, but rather calculate a volumetric flow rate by dividing the measured mass flow rate by the measured density. As such, errors in the measured flow metric flow rate of bubbly liquids are determined based on the errors in the measured mass flow and the measured density.

Mitigating errors reported by Coriolis meters operating on multiphase flows can be critical to enabling Coriolis meters to accurately characterize parameters of multiphase flows, including but not limited to mass flow and liquid phase density. It should be noted that for purposes of this disclosure that a Coriolis meter is defined using the prior art understanding, namely a device that utilizes an interpretation of the vibrational characteristics of one or more vibrating, flow tubes conveying a process fluid to determine either the mass flow or the density of both of said process fluid. Consistent with prior art understanding, Coriolis meters are typically calibrated to accurately report the mass flow and density of single phase process fluids, where single phase process fluids are typically homogeneous fluids and operate within the Coriolis meter at low or known reduced frequencies.

What is needed is a method that utilizes often readily available information on the characteristics of a bubbly mixture flowing through a Coriolis meter to quantify and to correct for the effects of the bubbly flow on the accuracy of a Coriolis meter.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include measuring a measured fluid density of a process fluid using a vibrational frequency of a fluid-conveying flow tube of the Coriolis meter where a density of a liquid phase of the process fluid is unknown. The method may also include measuring at least one of an excitation energy metric of the Coriolis meter and a vibrational amplitude metric of the Coriolis meter. The method may furthermore include determining a Coriolis Mass Flowmeter Damping (CMFD) parameter using at least one of the excitation energy metric and the vibrational amplitude metric. The method may in addition include determining the density of the liquid phase of the process fluid using the measured fluid density and the CMFD parameter. The method may moreover include where the determining the density of the liquid phase may include measuring the measured fluid density of the process fluid and determining the CMFD at a plurality of instances over which the CMFD parameter varies. Other embodiments of this aspect include corresponding computer systems, apparatus, and computer programs recorded on one or more computer storage devices, each configured to perform the actions of the methods.

Implementations may include one or more of the following features. The method where determining the density of the liquid phase of the process fluid may include using an optimization model, where the optimization model utilizes the measured fluid density and the CMFD parameter at the plurality of instances over which the CMFD parameter varies to determine an optimized estimate of the density of the liquid phase of the process fluid. The method may include measuring one or more additional parameters of the process fluid indicative of the process fluid at the plurality of instances, utilizing the one or more additional parameters of the process fluid to categorize the plurality of instances into one or more respective groups where one or more of the respective parameters of the process fluid are substantially equal, and determining an optimized estimate of the density of the liquid phase using the optimization model on at least one of the respective groups. The method where the one of more additional parameters is a parameter indicative of a mixture velocity, the method may include producing a plurality of mixture velocities at the plurality of instances, and sorting the mixture velocity at the plurality of instances into the respective groups based on respective mixture velocities. The method where the one or more additional parameters includes a process parameter indicative of the mixture velocity and a process parameter indicative of a process pressure, the method may include sorting the plurality of instances into one or more of the respective groups where the process parameters indicative of the mixture velocity are substantially equal and the process parameters indicative of the process pressure are substantially equal. The method where the optimized estimate of the density of the liquid phase of the process fluid may include determining a respective optimized liquid density for each of the respective groups and applying a respective weighting factor to each of the respective optimized liquid densities to determine the optimized estimate of the density of the liquid phase based on a weighted contribution from one or more respective groups. The method where the respective weighting factor may include a ratio of the standard deviation of the CMFD parameter within the respective group to the mean value of the CMFD parameter within the respective group multiplied by the number of mixture velocities in the respective group. The method may include applying a minimum required value for the vibration amplitude for the pluralities of instances in the optimization model to determine the density of the liquid phase based on the measured fluid density and a determined CMFD at a plurality of instances. The method where the CMFD is the ratio of the excitation energy metric to the vibrational amplitude metric. The method where the CMFD is the ratio of an offset-adjusted excitation energy metric and a vibration amplitude metric. Implementations of the described techniques may include hardware, a method or process, or a computer tangible medium.

In one general aspect, a system may include one or more processors configured to measure a measured fluid density of a process fluid using a vibrational frequency of a fluid-conveying flow tube of the Coriolis meter where a density of a liquid phase of the process fluid is unknown, measure at least one of an excitation energy metric of the Coriolis meter and a vibrational amplitude metric of the Coriolis meter, determine a Coriolis Mass Flowmeter Damping (CMFD) parameter using at least one of the excitation energy metric and the vibrational amplitude metric, and determine the density of the liquid phase of the process fluid using the measured fluid density and the CMFD parameter, and where the determining the density of the liquid phase may include measure the measured fluid density of the process fluid and determining the CMFD at a plurality of instances over which the CMFD parameter varies. Other embodiments of this aspect include corresponding computer systems, apparatus, and computer programs recorded on one or more computer storage devices, each configured to perform the actions of the methods.

Implementations may include one or more of the following features. The system where determining the density of the liquid phase of the process fluid may include using an optimization model, where the optimization model utilizes the measured fluid density and the CMFD parameter at the plurality of instances over which the CMFD parameter varies to determine an optimized estimate of the density of the liquid phase of the process fluid. The system may include measuring one or more additional parameters of the process fluid indicative of the process fluid at the plurality of instances utilizing the one or more additional parameters of the process fluid to categorize the plurality of instances into one or more respective groups where one or more of the respective parameters of the process fluid are substantially equal, and determining an optimized estimate of the density of the liquid phase using the optimization model on at least one of the respective groups. The system where the one of more additional parameters is a parameter indicative of a mixture velocity, the method may include producing a plurality of mixture velocities at the plurality of instances, and sorting the mixture velocity at the plurality of instances into the respective groups based on respective mixture velocities. The system where the one or more additional parameters includes a process parameter indicative of the mixture velocity and a process parameter indicative of a process pressure, the method may include sorting the plurality of instances into one or more of the respective groups where the process parameters indicative of the mixture velocity are substantially equal and the process parameters indicative of the process pressure are substantially equal. The system where the optimized estimate of the density of the liquid phase of the process fluid may include determining a respective optimized liquid density for each of the respective groups and applying a respective weighting factor to each of the respective optimized liquid densities to determine the optimized estimate of the density of the liquid phase based on a weighted contribution from one or more respective groups. The system where the respective weighting factor may include a ratio of the standard deviation of the CMFD parameter within the respective group to the mean value of the CMFD parameter within the respective group multiplied by the number of mixture velocities in the respective group. The system may include applying a minimum required value for the vibration amplitude for the pluralities of instances in the optimization model to determine the density of the liquid phase based on the measured fluid density and a determined CMFD at a plurality of instances. The system where the CMFD is the ratio of the excitation energy metric to the vibrational amplitude metric. The system where the CMFD is the ratio of an offset-adjusted excitation energy metric and a vibration amplitude metric. Implementations of the described techniques may include hardware, a method or process, or a computer tangible medium.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
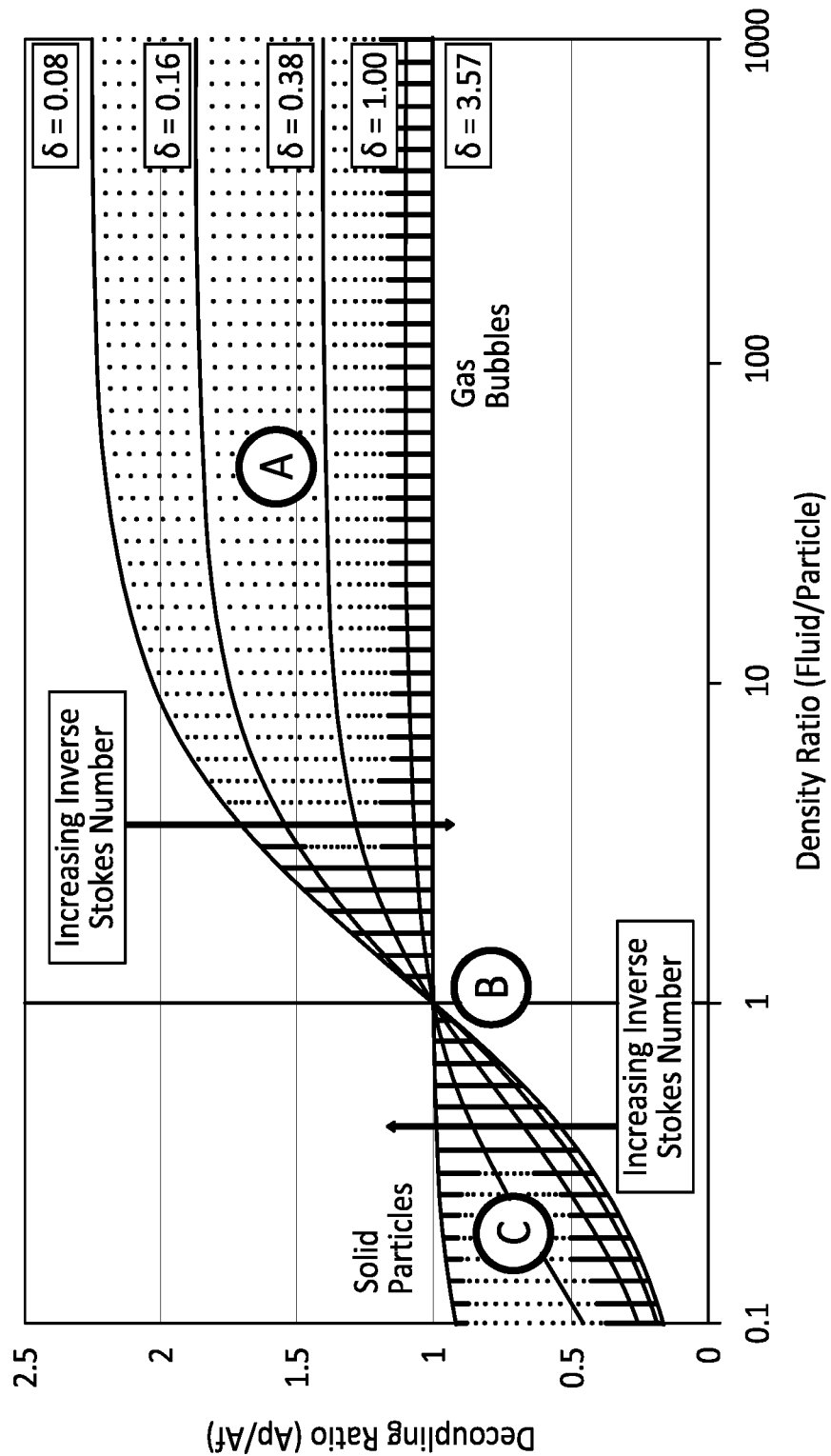
FIG. 1 is a graphical representation of an analytical model for the decoupling amplitude ratio as a function of density ratio for a range of inverse Stokes numbers of the prior art.

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Researchers have developed reduced-order analytical models which predict errors in the reported mass flow and density from Coriolis meters operating on bubbly flows. These models have identified two primary mechanisms for errors associated with Coriolis meters operating on bubbly liquids, namely decoupling and compressibility. Decoupling is said to occur when components of a multiphase mixture being conveyed within a transversely vibrating flow tube, vibrating at different amplitudes. For example, when particles or bubbles being conveyed by a continuous-phase liquid vibrate at a different amplitude than the liquid phase. These models predict that the amount of decoupling that occurs is a function of a several variables. For liquid continuous flows with particles (or bubbles), the ratio of amplitudes of vibration of the particles (or bubbles) to the continuous liquid has been shown to be a function of the inverse Stokes number and the density ratio between the continuous phase fluid to the density of the particles.

The inverse Stokes number is defined as:

$$\delta \equiv \sqrt{\frac{2v}{(2\pi f)R_{bubble}^2}} \quad \text{(Equation 1)}$$

Where v is the kinematic viscosity of the continuous phase of the bubbly mixture, f is the cyclical frequency of oscillation, and $R_{bubble}$ is a length scale that is representative of the radius of the bubble or bubbles. For example, for flows with a range of bubble sizes, $R_{bubble}$ could represent an average bubble radius.

For gas bubbles, in the limit of small inverse Stokes number, analytical models predict that the ratio of the amplitude of vibration of a bubble to the amplitude ratio of the continuous liquid phase approaches 3, and the gas bubbles are said to be fully-decoupled. In the limit of large inverse Stokes number, the bubble becomes fully-coupled to the liquid phase and amplitude ratio approaches 1. In bubbly flows, the effect of a decoupling results in an increase in the vibrational amplitude of the bubbles, and a reduction in the vibrational amplitude of the liquids. As a result, decoupling typically causes Coriolis meters to under-report the mass flow and density of bubbly liquids. All of the methods disclosed and claimed herein can be made and executed without undue experimentation in light of the present disclosure. While the apparatus and methods of this disclosure have been described in terms of preferred embodiments, it will be apparent to those of skill in the art that variations may be applied to the methods and in the steps or in the sequence of steps of the method described herein without departing from the concept, spirit and scope of the disclosure. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the disclosure.

Referring to FIG. 1, there is shown a graphical representation 10 of the results of analytical model for the decoupling amplitude ratio as a function of density ratio for a range of inverse Stokes numbers. (reference Weinstein, Joel, "Multiphase Flow in Coriolis Mass Flow Meters—Error Sources and Best Practices", 28th International North Sea Flow Measurement Workshop 26-29 Oct. 2010.) Note that for bubbly flows, the density ratio is defined as the continuous phase (i.e. the liquid) density divided by particle (i.e. the gas) density. For many applications of bubbly fluids, this ratio is on order of 10 to 1000, depending on the pressure of the application.

In addition, to errors associated with decoupling of the particles, Coriolis meter operating in bubble flows can develop errors due to compressibility. Compressibility effects develop when the first acoustic cross mode of the fluid conveying flow tubes begins to participate in the transverse vibration of the fluid-conveying flow tubes. The degree of participation of the first acoustic cross mode scales with the reduced frequency defined as:

$$f_{red} \equiv \frac{2\pi f_{tube} D/2}{a_{mix}} \quad \text{(Equation 2)}$$

Where, $f_{tube}$, the vibration frequency of the fluid-conveying flow tube, D is the diameter of the flow tube, $\alpha_{mix}$ is the speed of sound of the process fluid, Hemp (2006) developed a model for the effects of decoupling and compressibility on Coriolis meter operating in bubbly flows, where the actual mass flow and density of liquid phase is related to the measured mass flow and density from a Coriolis meter that was calibrated for single phase flows, but is operating on multiphase flows.

$$\rho_{meas} = (1 - k_d \alpha + G_d(f_{red})^2)\rho_{liq} \text{ for density} \quad \text{(Equation 3)}$$

$$\text{and } \dot{m}_{meas} = \left(1 - \frac{(k_m - 1)}{1 - a}\alpha + G_m(f_{red})^2\right)\dot{m}_{mix} \text{ for mass flow} \quad \text{(Equation 4)}$$

Where $\rho_{meas}$ is the density measured by said Coriolis flow meter, $\dot{m}_{meas}$ is the mass flow measured by said Coriolis meter, $\alpha$ is the gas void fraction, and $k_d$ and $k_m$ are, as defined herein, the density decoupling parameter and the mass flow decoupling parameter respectively and may be constants or complex functions of other multiphase flow parameters.

The density decoupling parameter, $k_d$, and the mass flow decoupling parameter, $k_m$, as defined herein can be used in conjunction with a known or measured gas void fraction to correct for the effects of various amounts of decoupling on the measured density measurement and mass flow measurement of a Coriolis meter as defined in Equations 3, 4 and to report a corrected density of the process fluid and a corrected mass flow of the process fluid.

Wherein $k_d$ and $k_m$ are the density decoupling parameter and the mass flow decoupling parameter respectively. Based on theoretical models, these parameters are bounded within the range of $1 > k_d > k_{dmax}$ and $1 > k_m > k_{mmax}$. Hemp suggests that $k_{dmax}=3$ and $k_{mmax}=3$. The specific value of the density decoupling parameter at any given operating condition is known to depend at least on the inverse Stokes number. In this formulation, errors due to the effects of compressibility on the measured density are given by the product of the density compressibility parameter $G_d$, and the square of the reduced frequency, and errors due to the effects of compressibility on the measured mass flow are given by the product of the compressibility parameter, $G_m$ and the reduced frequency squared. The mass flow and density compressibility parameter can be determined analytically or empirically. Hemp suggests these to be constants with $G_d=0.25$ and $G_m=0.50$. Note that the density decoupling parameter and the mass flow decoupling parameter can often be assumed to be related through an empirical or analytical model, such that knowing or determining one, determines the other.

Prior art methods have utilized analytical models developed by Hemp and others as a basis with which to correct for errors in the measured mass flow and/or density of Coriolis meters operating on bubbly flows. However, even though the analytical models often result in concise, qualitatively correct models for the errors due to bubble flows, implementing these models on a real time basis to correct for the errors due to bubbly flows has had limited success due to a variety of reasons. These reasons include an inability to predict model input parameters with sufficient accuracy on a practical basis, such as the decoupling and compressibility parameters, and a need for often unavailable parameters of the multiphase flows such as inverse Stokes numbers, gas void fraction, and reduced frequency as model input parameters.

It should be appreciated by those skilled in the art that the mass flow decoupling parameter and the density decoupling parameter is reflective of the ratio of the amplitude of vibration of the particle, or bubble, to amplitude of the vibration of the continuous phase (for bubbly flows, the liquid phase) in an inhomogeneous fluid undergoing transverse vibration. As indicated in FIG. 1, the mass flow decoupling parameter and density decoupling parameter for a given set of conditions are a function of bubble size. For a bubbly mixture vibrating within a flow tube of a given density ratio, a given fluid viscosity, and at a given frequency, the amount of decoupling typically increases with increasing bubble size.

Bubble size, however, is typically unknown and can be highly variable. Bubble size within a bubbly liquid can depend on many factors, including flow velocity and surface tension effects and other factors. Directly calculating or measuring bubble size for a standard process measurement is likely either impractical or cost prohibitive for most applications. The processing of determining bubble size is often further confounded by bubble coalescence. Bubbles, once formed as smaller bubbles, can also coalesce to form fewer but larger bubbles. Prior art methods to correct for the effects of bubbly liquids on Coriolis meter often utilize an assumption regarding decoupling, namely the process fluid within the vibrating flow tubes behaves as either a fully coupled flow ($K_d=K_m=1$) or a fully decoupled flow ($K_d=K_m=3$). Although bubble size is an important parameter governing the behavior of bubbly fluid within Coriolis meters, the methodologies presented in this disclosure do not require any direct measurement of knowledge of the bubble size.

This disclosure provides methods to quantify and to correct for the errors in the density reported by a Coriolis meter operating on flows with particles in general, bubbly liquids specifically, utilizing often readily available information on the characteristics of the process fluid such as measure fluid density. The methodologies disclosed here leverage reduced order models to identify readily available information on the characteristics of the process fluid to identify which groups of process conditions are likely to result in characteristics that enable identification and mitigation of errors due to multiphase flow conditions within a Coriolis meter operating over a range of multiphase flow conditions. This novel and innovative approach is described theoretically and demonstrated experimentally hereinafter.

For cases in which the volumetrically-weighted compressibility of the gas phase is dominant, which is typically a good approximation at low pressures with gas void fractions $>\sim 0.1\%$, a simplified version of the Wood's equation can be used to express the gas void fraction as proportional to the inverse of the square of process fluid sound speed as follows:

$$\alpha \cong \frac{\gamma P}{\rho_{liq} a_{mix}^2} \quad \text{(Equation 5)}$$

Where $\gamma$ is the polytropic exponent governing the compressibility of the gas bubbles and P is the process pressure. The sound speed of the gas is expressed as a function of gas temperature, T, the gas constant, R, and the polytropic exponent $\gamma$.

$$a_{gas} = \sqrt{\gamma R T} \quad \text{(Equation 5a)}$$

The appropriate polytropic exponent depends on the frequency of the sound waves compared to a thermal relaxation frequency set by the bubble diameter and the thermal diffusivity of the gas [14]. For air bubbles, this polytropic exponent can range from isothermal conditions, $\gamma=1.0$, for low frequencies compared to the thermal relaxation frequency, to isentropic conditions, $\gamma=1.4$, for high frequencies compared to the thermal relaxation frequency.

Using this relationship and the definition of reduced frequency, the relationship between the square of the reduced frequency and the gas void fraction of a bubbly liquid can be expressed in the form of reduced pressure, defined below:

$$P_{red} \equiv \frac{\gamma P}{\rho_{liq}\left(2\pi f_{tube}\frac{D}{2}\right)^2} \approx \frac{a}{f_{red}^2} \quad \text{(Equation 6)}$$

Thus, for a bubbly liquid operating an essentially constant pressure within a given Coriolis meter, the ratio the gas void fraction to the reduced frequency is essentially constant, independent of the gas void fraction.

In Hemp's formulation, for conditions in which the liquid density, $\rho_{liq}$, and density decoupling parameter, $k_d$, and the density compressibility parameter, $G_d$, and the reduced pressure, $P_{red}$, are essentially constant, the measured density can be expressed as a linear function of gas void fraction.

$$\rho_{meas} = \rho_{liq}(1 - k_d\alpha + G_d(f_{red})^2) = \rho_{liq}\left(1 - \left(k_d + \frac{G_d}{P_{red}}\right)\alpha\right) \quad \text{(Equation 7)}$$

Methods have been developed to correct Coriolis meters by determining the effects of decoupling and compressibility of bubbly flows on the reported outputs of Coriolis meters. These methods typically involve measuring one or more additional process parameters such as the vibrational frequencies of a process fluid conveying flow tube at more than one resonant frequency or measuring the process fluid speed of sound to determine gas void fraction and then utilizing various methods. Also, these methods often utilize simplifying assumptions of the properties of the process fluid that often limit the applicability of the proposed solution. For example, Reider et al utilizes a dual frequency Coriolis meter in which he assumes that the bubbly fluid behaves as a fully-decoupled fluid at each of the vibrational frequencies to determine a process fluid gas void fraction and improved density and mass flow.

Also, prior art Gysling utilizes a process fluid speed of sound measurement to augment a single or dual frequency Coriolis meter at a plurality of instances in time to determine the gas void fraction, a density decoupling parameter, and an improved liquid density of the fluid.

As defined herein, excitation energy metric (herein after EE) refers to any measure of the energy required to be input into to the vibration of the fluid containing and/or conveying flow tubes of a Coriolis meter to maintain any desired amplitude of vibration of said flow tubes. Typically, Coriolis meter electronic circuitry is designed to maintain a fixed level of vibrational amplitude within the tubes, and to output an energy excitation metric that quantifies the energy input into the vibrating flow tubes. The excitation energy metric signal reported by a Coriolis meter typically increases with the introduction of inhomogeneities in the process fluid, indicating that, to maintain a constant amplitude of vibration, the drive electronics must input more energy into the vibrational mode to compensate for the effect of the inhomogeneities within the vibrating flow. Thus, as the amount inhomogeneity increases, the required excitation energy metric increases, until a point at which the excitation energy metric reaches a saturation limit. Additionally increases in flow inhomogeneities beyond the level at which the excitation energy metric saturates, typically results in a decrease in the amplitude of the vibration of flow tubes. In addition to an excitation energy metric, a vibrational amplitude of the flow tubes is typically monitored and output from transmitters of modern Coriolis meters and is defined herein as a vibrational amplitude metric, VA. As is known in the art, the transmitter of a Coriolis meter includes a processor and software configured to determine different measurements and parameters of the process fluid using sensors integral to the Coriolis meter or positioned external to the Coriolis meter. It is contemplated by the current disclosure that the methods disclosed herein can be implemented in the form of software, firmware or the like, configure to be used with a processor such as those found in Coriolis meters or other known processors.

Zhu (2009) defined a Coriolis mass flowmeter damping parameter (as used herein as CMF damping parameter or CMFD parameter) as the ratio of an excitation energy metric and a tube vibrational amplitude metric. Since Coriolis meters are typically designed the maintain a constant vibrational amplitude for conditions for which the excitation energy metric is not saturated, in general, the CMF damping term is equivalent to the excitation energy metric for conditions for which the excitation energy metric is not saturated. Beyond conditions at which the EE becomes saturated, the CMF damping term will increase with decreasing VA.

Zhu teaches to utilize the CMF damping parameter as a means correct the output of Coriolis meters operating on bubby flows. Specifically, Zhu taught the use of the CMF damping to determine a measure of the ratio between the frequency of a first acoustic cross model and the vibrational frequency of the Coriolis flow tubes, as a means, to determine a process fluid sound speed. Zhu teaches that the increase in damping associated with increasing gas void fractions is primarily associated with an increase compressibility, and teaches that the effect of compressibility on damping is, in general, much larger than the effects of decoupling measured damping.

Basse develop a reduced order analytical model that relates a Coriolis Damping parameter to effects of decoupling. Basse's model relates Coriolis damping to the energy dissipated due to relative motion associated with decoupling between the entrained particles and the liquid phase within the vibrating flow tubes of a Coriolis meter. Basse's model does not consider the impact of the compressibility on the amount of energy required to maintain a given vibrational amplitude of the Coriolis meter. It should be appreciated by those skilled in the art the methodology disclosure herein recognizes that the CMF damping factor is influenced by both decoupling and compressibility effects.

This disclosure teaches a method to quantify and to correct for the effects of bubbly fluids on the density measurement of a Coriolis meter to determine the density of the liquid phase of a bubbly fluid. The methodology utilizes an offset-adjusted excitation energy metric and a vibrational amplitude metric, each of which is typically output from a Coriolis meter in real time, to quantify a relationship between the density reported by a Coriolis operating on a bubbly mixture and the density of the liquid phase of said bubbly mixture. For bubbly liquid applications, the value of excitation energy metric reported by the Coriolis meter operating on the liquid phase without any gas void fraction present is defined as the excitation energy metric offset. The excitation energy metric offset can range from relatively low values of a few percent of saturation for smaller Coriolis meters to values >20% for larger Coriolis meters. The approach utilizes measurements from a Coriolis meter operating on bubbly flows at multiple instances in time for which the liquid density and pressure of the bubbly mixture is sufficiently constant, and for which the excitation energy metric and/or the vibrational amplitude of the flow tubes varies. This novel approach does not require calibration data from Coriolis meters operating on bubbly flows and is capable of determining an estimate of the density of the liquid phase of a bubbly fluid based on contemporaneous data from a Coriolis flow meter.

It is anticipated that any model linking the effects of bubbly fluids on the density measurement of a Coriolis meter and the CMF damping may vary for different Coriolis flow meter designs and also may vary with large changes in fluid parameters, however, as the experimental data in this disclosure demonstrates, the relationship between the effects of bubbly flow on the density measurement and the CMF damping are adequately robust to provide a significant reduction errors in the interpreted density of the liquid phase over a range of bubbly flows with significant variability.

A density error parameter as used herein is defined as:

$$\Psi \equiv 1 - \frac{\rho_{meas}}{\rho_{liq}} \quad \text{(Equation 8)}$$

Where $\rho_{liq}$ the density of the liquid and $\rho_{meas}$ is the density reported by a Coriolis meter operating on a bubbly mixture but calibrated on a single phase, essentially homogeneous liquid with a small reduced frequency, $f_{red} \ll 1$, the reduced frequency.

Figure 3:
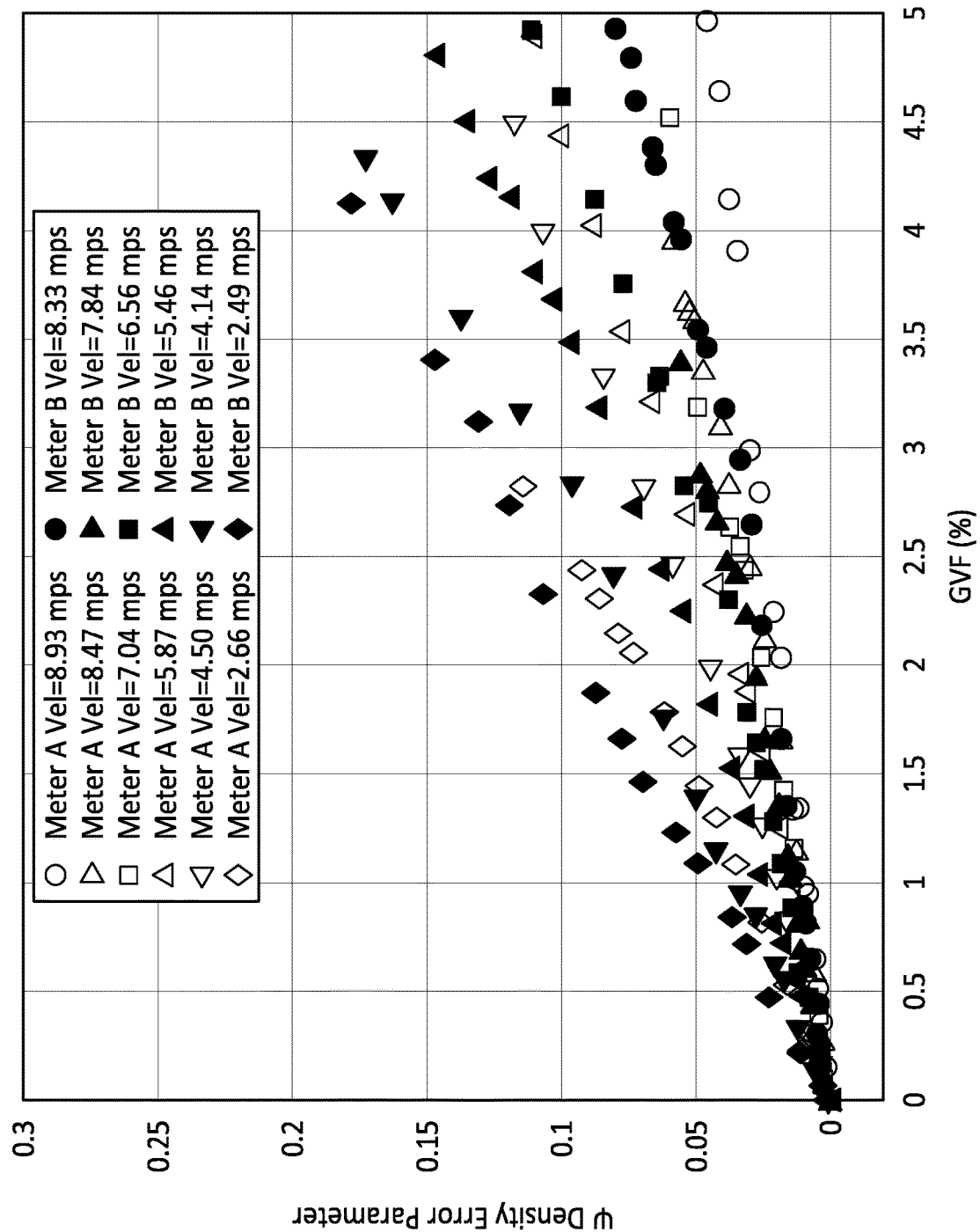
FIG. 3 is a graphical representation of the density error parameter, Y', plotted versus the gas void fraction for two Coriolis meters in accordance with the present disclosure.

FIG. 3 shows the density error parameter, $\Psi$, plotted versus the gas void fraction for two modern Coriolis meters operating on bubbly mixtures of air and water flow over a range of mixture velocities and gas void fractions. The nominal mixture mass flow rates, flow velocities in the tubes, pressures, and reduced pressures are listed in Table 1.

TABLE 1

| Coriolis Meter A ID = 1.06 in/$f_{tube}$ = 80 Hz | | | | Coriolis Meter B ID = 1.10 in/$f_{tube}$ = 175 Hz | | | |
|---|---|---|---|---|---|---|---|
| Mass Flow (kg/s) | Vel Nom (m/s) | Pressure (psia) | Reduced Pressure | Mass Flow (kg/s) | Vel Nom (m/s) | Pressure (psia) | Reduced Pressure |
| 10.15 | 8.93 | 25.0 | 3.49 | 10.16 | 8.33 | 23.8 | 0.75 |
| 9.61 | 8.47 | 30.0 | 4.20 | 9.55 | 7.84 | 30.4 | 0.96 |
| 7.98 | 7.04 | 23.8 | 3.33 | 7.98 | 6.56 | 23.5 | 0.74 |
| 6.65 | 5.87 | 30.9 | 4.33 | 6.65 | 5.46 | 30.8 | 0.97 |
| 5.1 | 4.50 | 37.3 | 5.23 | 5.02 | 4.14 | 37.6 | 1.18 |
| 3.01 | 2.66 | 43.0 | 6.03 | 3.02 | 2.49 | 43.2 | 1.36 |

Figure 2:
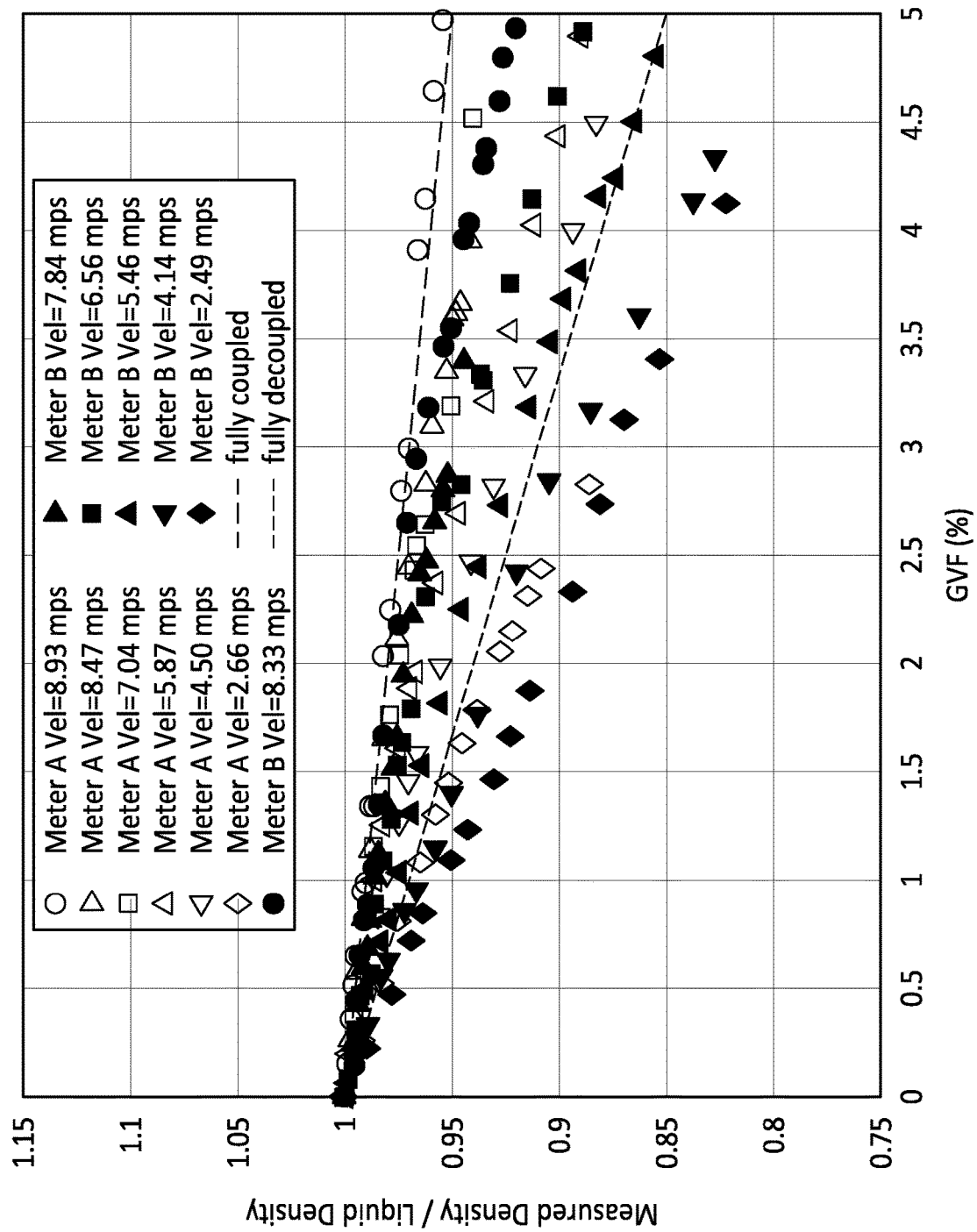
FIG. 2 is a graphical representation of the measured density normalized by the liquid density plotted as a function of gas void fraction for two Coriolis meters in accordance with the present disclosure.

As shown, for each of the Coriolis meters operating under conditions for which the liquid density is constant, the nominal flow rate is constant, and the nominal pressure is constant, but the gas void fraction is varied from 0% to ~5%, the density error parameter scales approximately linearly with gas void fraction consistent with the linear trend predicted by Hemp's model. The slope of the density error parameter versus gas void fraction does vary significantly for the range of conditions tested, with the density error parameters ranging from ~-1×GVF to ~-4×GVF. Hemp's model predicts that the density error parameter will be influenced by decoupling and compressibility effects, with decoupling driving under-reporting and compressibility driving over reporting. Since positive density error parameters indicate under-reporting and negative density decoupling parameters indicate over-reporting, it is reasonable to conclude that the data presented in FIG. 2 represents a range of conditions over which there may be a relatively broad mix of decoupling and compressibility effects.

Although not explicitly measured, the variation in the slope of the density error parameter versus gas void fraction among the various data sets is likely due to bubble size variation with mixture flow velocity. The average bubble size within mixtures is typical set by complex equilibrium conditions that balance mechanisms that tend to increase bubble size, such as bubble coalescence, and mechanisms that tend to decrease bubble size such as shearing effects associated with turbulence. For bubby mixtures, in general, increasing mixture flow velocities increases shearing effects due to bubbles and typically results in smaller bubble sizes. Smaller bubbles mean larger inverse Stokes numbers, and, in general, reduced decoupling effects.

The excitation energy metric reported by each of the Coriolis meters as a function of gas void fraction is shown in FIG. 3. As shown, the EE increases with GVF until it reaches the saturation limit of 100%. As the GVF is increased beyond the saturation limit, the EE remains at 100%. Note that a significant fraction of the data points are data points for which the EE is saturated.

Figure 4:
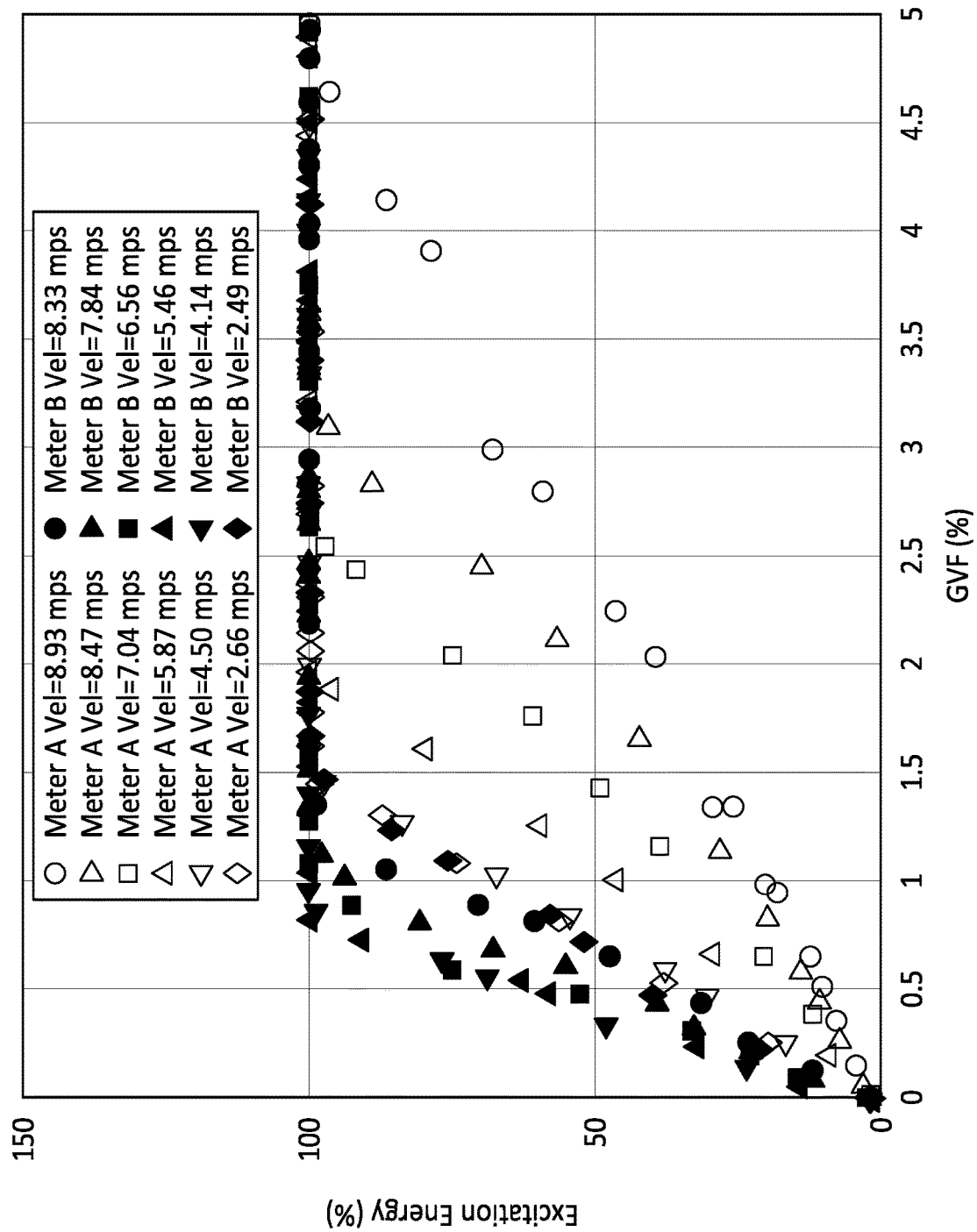
FIG. 4 is a graphical representation of the excitation energy metric plotted versus the gas void fraction for two Coriolis meters in accordance with the present disclosure.

FIG. 4 shows the excitation energy metric, as defined herein, as a function of gas void fraction for the data shown for the two modern Coriolis meters over a range a bubbly air and water mixtures.

Figure 5:
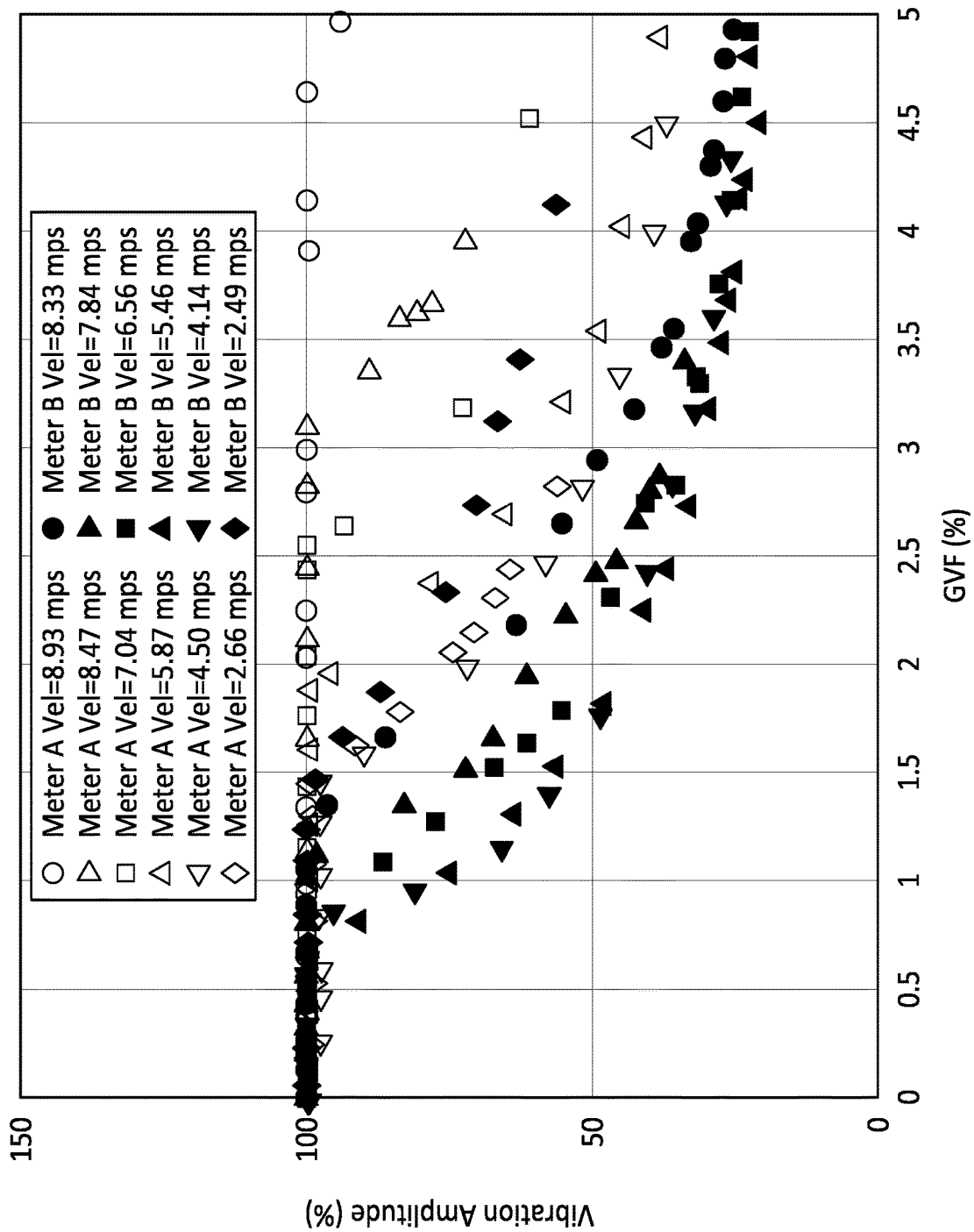
FIG. 5 is a graphical representation of the vibration amplitude metric as a function of gas void fraction for two Coriolis meters in accordance with the present disclosure.

FIG. 5 shows the vibration amplitude metric as a function of gas void fraction for the data shown for the two modern Coriolis meters over a range a bubbly air and water mixtures. As shown, the vibration amplitude metric remains at 100% for conditions for which the excitation energy is not saturated. However, after saturation, the vibration amplitude metric decreases with increasing gas void fraction.

Figure 6:
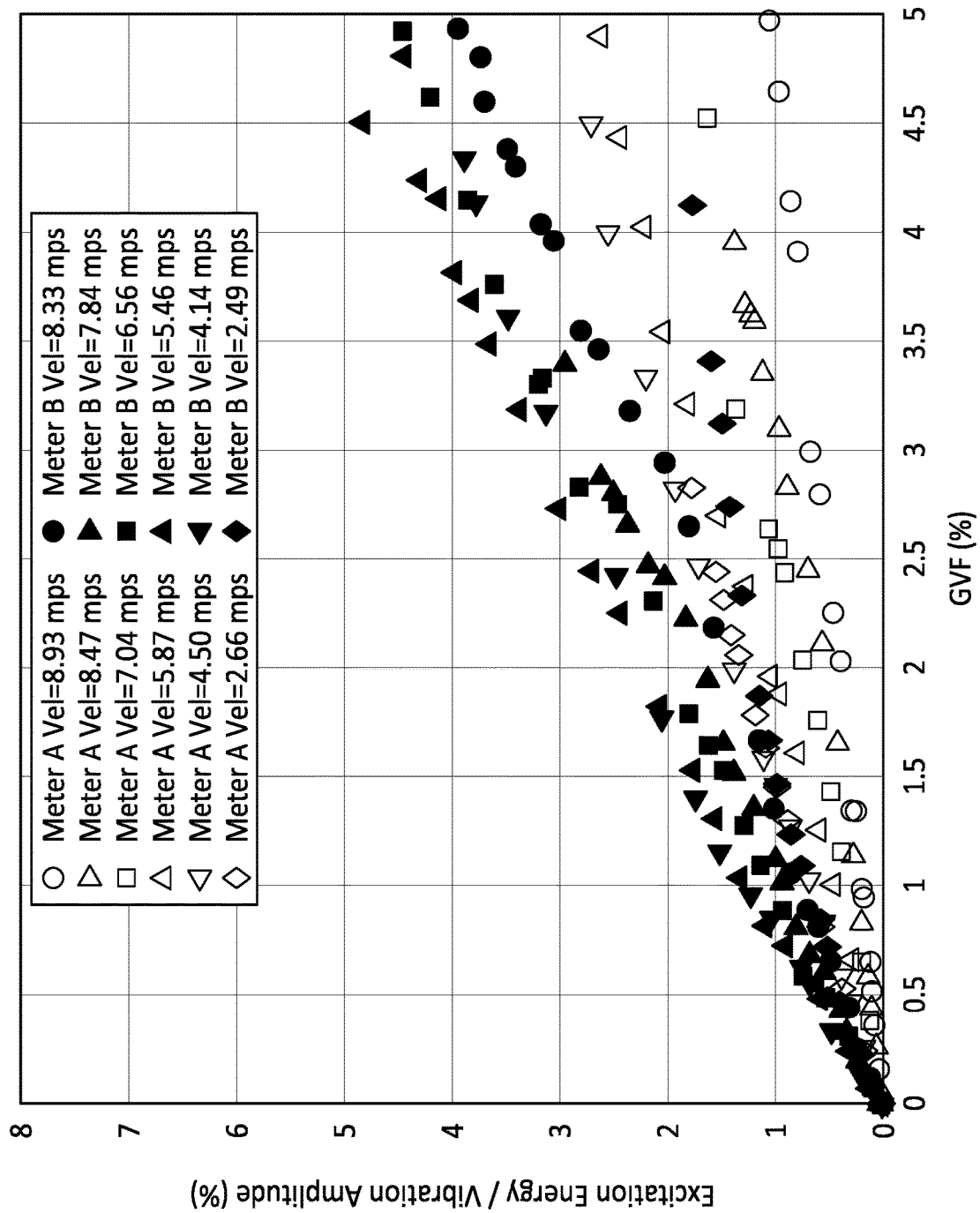
FIG. 6 is a graphical representation of the Coriolis mass flowmeter damping parameter as a function of gas void fraction for two Coriolis meters in accordance with the present disclosure.

FIG. 6 shows a Coriolis mass flowmeter damping parameter, defined as the ratio of the excitation energy metric to the vibration amplitude metric, as a function of gas void fraction. As shown, the CMF damping parameter exhibits a monotonic, nearly linear, relationship with gas void fraction through the drive gain saturation condition. The slope of the CFM damping parameter is shown the vary with flow conditions and between the two Coriolis meters, with the slope of the CFM damping versus gas void fraction versus gas void fraction being in general higher for Coriolis meter B with the lower reduced pressures.

Figure 7:
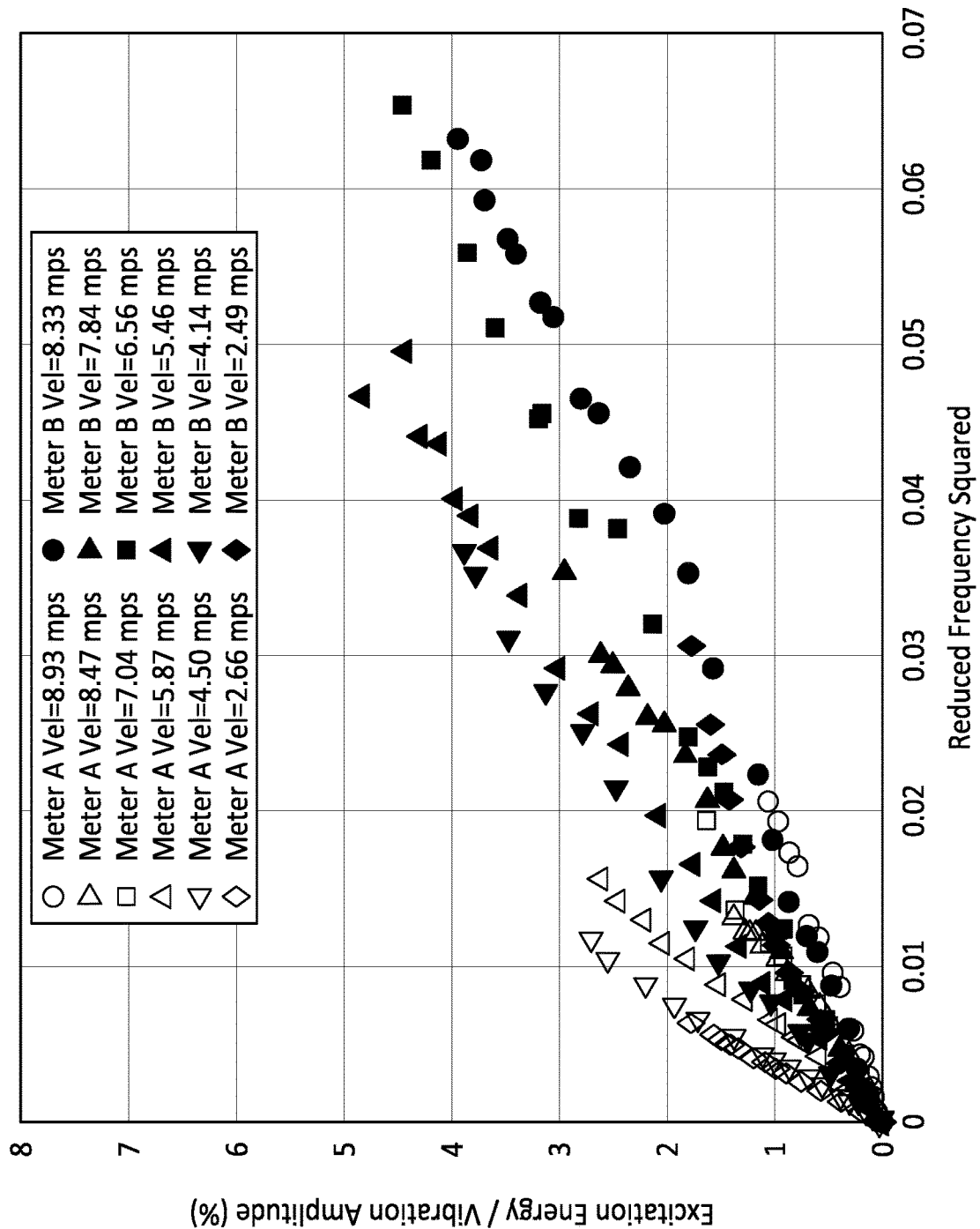
FIG. 7 is a graphical representation of the Coriolis mass flowmeter damping parameter as a function of the reduced frequency squared for two Coriolis meters in accordance with the present disclosure.

FIG. 7 shows a Coriolis mass flowmeter damping parameter as a function of the reduced frequency squared. As shown, the CMF damping exhibits a nearly linear relationship versus the reduced frequency squared for data points operating with a constant liquid density, constant pressure, and constant mass flow rate, but with varying gas void fraction. However, the slope of the near linear relationship varies significantly among the various operating conditions and between the two meters.

Figure 8:
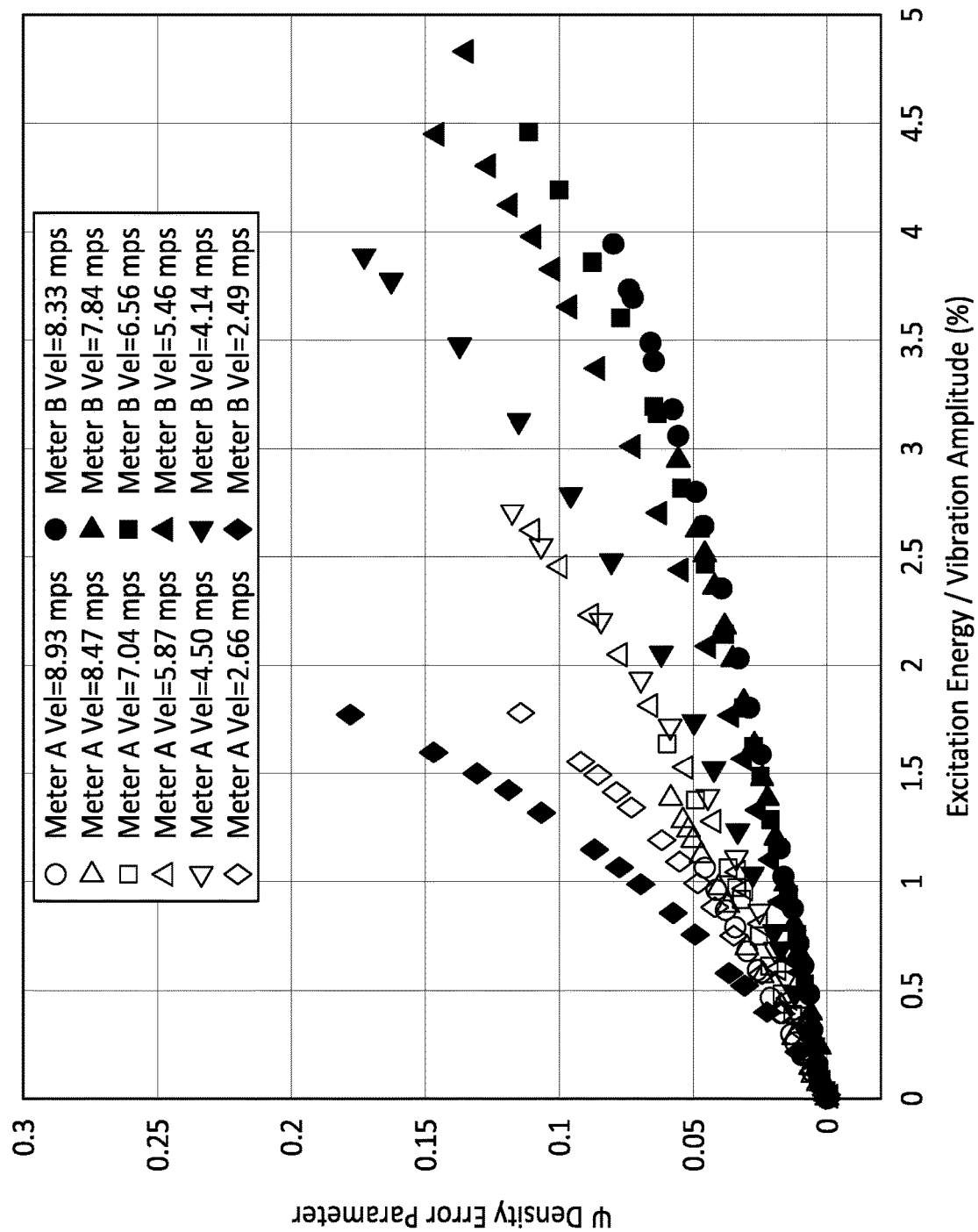
FIG. 8 is a graphical representation of the density error parameter, Y', as a function of a CMF damping parameter for two Coriolis meters in accordance with the present disclosure.

FIG. 8 illustrates graphically that the density error parameter exhibits a monotonic relationship with the Coriolis flow meter damping parameter through saturation of the excitation energy. The monotonic relationship between the density error function and the CMF damping parameter for bubbly liquids with essential constant liquid mass flow and liquid density and pressure but with varying gas void fraction inventively provides a means to determine the density of the liquid phase of a bubbly liquid where similar conditions hold.

For example, in many bubbly flow applications, the gas void fraction varies over relatively short time scales compared to the time scales over which the other parameters such as liquid density and mass flow vary significantly. Under such conditions, a least squared optimization of parameters which defines a parametric relationship between the density measured by the Coriolis meter and the Coriolis flow meter damping parameter and the density of the liquid phase can be performed to determine liquid density of the bubbly mixture.

One embodiment of the current invention utilizes assumes that the relationship between a time varying measured density and the density of the liquid phase a bubbly mixture can be expressed as a function of an "offset-corrected Coriolis mass flowmeter damping parameter", $D_{cmf}$, where $D_{cmf}$ is defined as:

$$D_{cmf}(t) \equiv \frac{EE(t) - EE_0}{VA(t)} \qquad \text{(Equation 9)}$$

Where the excitation energy offset, $EE_0$, correction recognizes that excitation energy metric is non-zero under single phase conditions. It should be noted that the EE under single phase flow is typically fairly stable for a range of fluids, and can be measured under single phase conditions. Also, as $EE_0$ approaches zero, $D_{cmf}$ approaches CMF damping. This disclosure utilizes an offset-adjusted CMF damping parameter for clarity associated with liquid-only conditions coinciding with the offset-adjusted CMF damping parameter equaling zero. However, it is noted that there are many variations of parameters that are indicative of the Coriolis mass flowmeter damping, any of which could be used without departing from the scope of this invention.

In one embodiment of the current disclosure, the density of the liquid phase of a bubbly liquid is related to the density measured by a Coriolis meter operating on the bubbly liquid by the following relationship:

$$\rho_{liq} = \rho_{meas}(t) + f(D_{CMF}(t)) \qquad \text{(Equation 10)}$$

In this embodiment, the density of the liquid phase is assumed constant over a time scale over which the gas void fraction, and hence offset-adjusted CFM damping vary. One embodiment assumes the following parametric relationship:

$$\rho_{meas_i} = \rho_{liq} + \beta_{D_1} D_{CFM} + \beta_{D_3} D_{CFM}^3 \qquad \text{(Equation 11)}$$

Where $\beta_{D_1}$ and $\beta_{D_3}$ are the weighting coefficients for the linear and cubic terms for the offset-adjusted CMF damping parameter, $D_{CFM}$, and where values for the liquid density, $\rho_{liq}$, and $\beta_{D_1}$ and $\beta_{D_3}$ are unknown, but assumed to constant for a series a instances for which $D_{CFM}$ is varying, but the liquid density, mass flow, and pressure are sufficiently constant.

Specifically, applying this relationship at N instances of time, the above relationship can be used to form N equations for M unknowns, where M the unknowns are the correlation parameters output parameters, $\rho_{liq}$, and $\beta_{D_1}$ and $\beta_{D_3}$, as shown below:

$$\lfloor 1 \; D_{cmf_i} \; D_{cmf_i}^3 \rfloor_{NXM} \begin{Bmatrix} \rho_{liq} \\ \beta_{D_1} \\ \beta_{D_3} \end{Bmatrix}_{MX1} = \lfloor \rho_{meas_i} \rfloor_{NX1} \qquad \text{(Equation 12)}$$

For conditions where there are more data points than correlation weighting parameters, the set of N equations associated with the N data points represent an over-constrained, linear set of N equations for the M unknown correlation output parameters which can be expressed in standard form as follows.

$$A_{NXM} X_{MX1} = B_{NX1} \qquad \text{(Equation 13)}$$

An optimized least squares solution for the correlation parameters is given by:

$$X_{opt_{MX1}} = (A_{NXM}^T A_{NXM})^{-1} A_{NXM}^T B_{NX1} = \begin{Bmatrix} \rho_{liq_{opt}} \\ \beta_{D_{1_{opt}}} \\ \beta_{D_{3_{opt}}} \end{Bmatrix}_{MX1} \qquad \text{(Equation 14)}$$

Where T denotes the matrix transpose, and (−1) denotes the matrix inverse. Ideally, since the offset-adjusted CMF damping parameter can in many cases vary significantly over relatively short time scales, this approach can be applied over sufficiently short time periods that this approach can effectively measure changes in liquid density over longer time periods.

For example, for density based water cut measurements made utilizing a Coriolis-based density measured of bubbly oil, water, and gas mixtures exiting the liquid outlet of a separator. The gas void fraction in the mixture tends to vary over significantly shorter times scales than the water cut of the liquid phase of the bubbly liquid.

Figure 9:
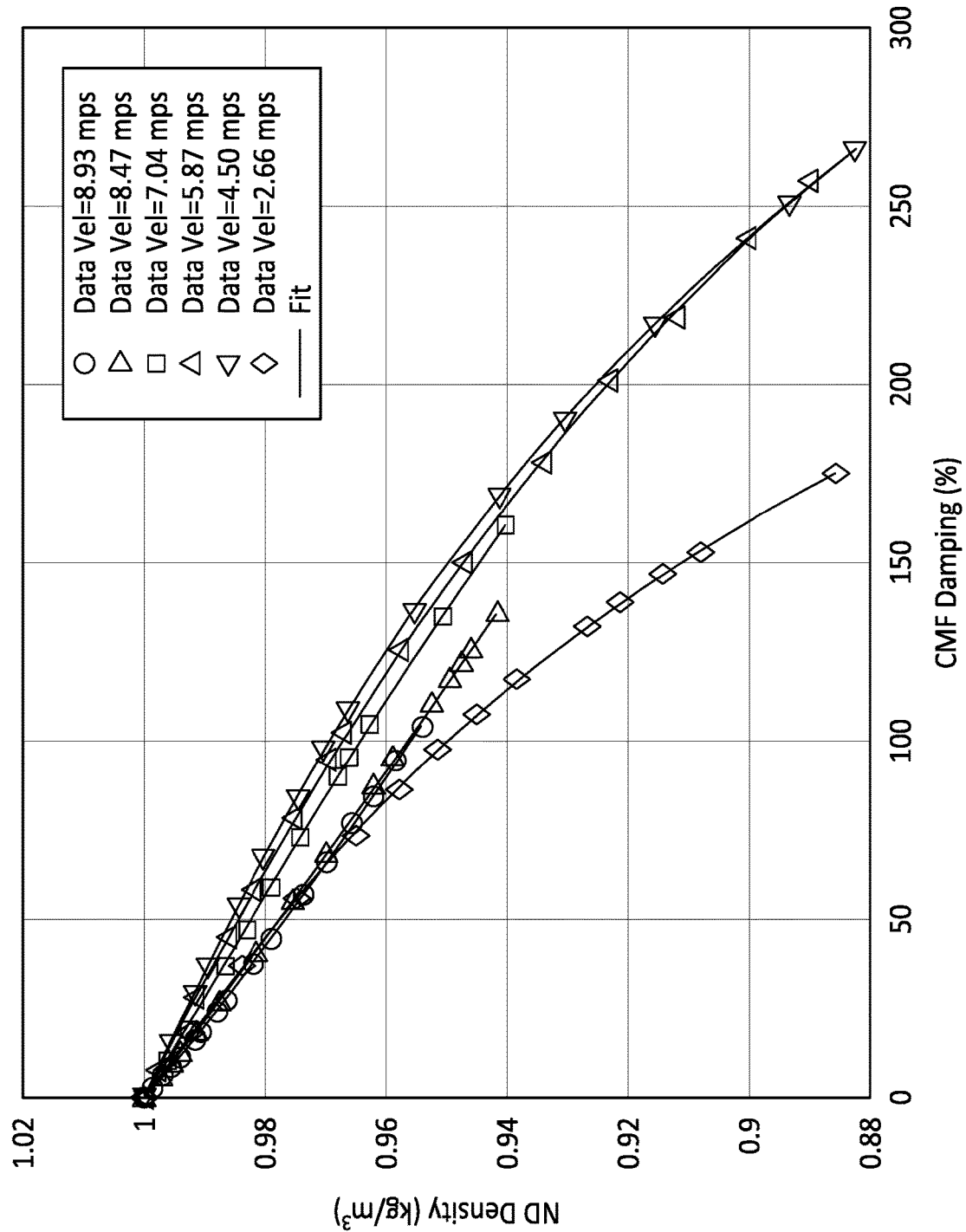
FIG. 9 is a graphical representation of the measured density and a parametric fit of the measured density versus CMF damping parameter for a Coriolis meter in accordance with the present disclosure.

FIG. 9 shows the measured density and a parametric fit of the measured density versus offset adjusted CMF damping parameter for 6 data sets from Coriolis Meter A. The parametric fit utilizing liquid density, and linear and cubic terms for an offset corrected CMF damping for Coriolis meter A operating over a range of nominal mixture velocities from 2.66 m/s to 8.93 m/s and over a range of gas void fractions from 0% to 5%. As shown, the low order parametric fit captures between the measured density and the offset-adjusted CMF damping parameter the data quite well for each data set. The fit results in an optimized liquid density of ranging from 0.9994 to 1.0002 times the actual liquid density times the measured liquid density and with each of the 6 fits resulting in a coefficient of determination of greater than 0.9996, indicating that the fit captures the data very well.

Figure 10:
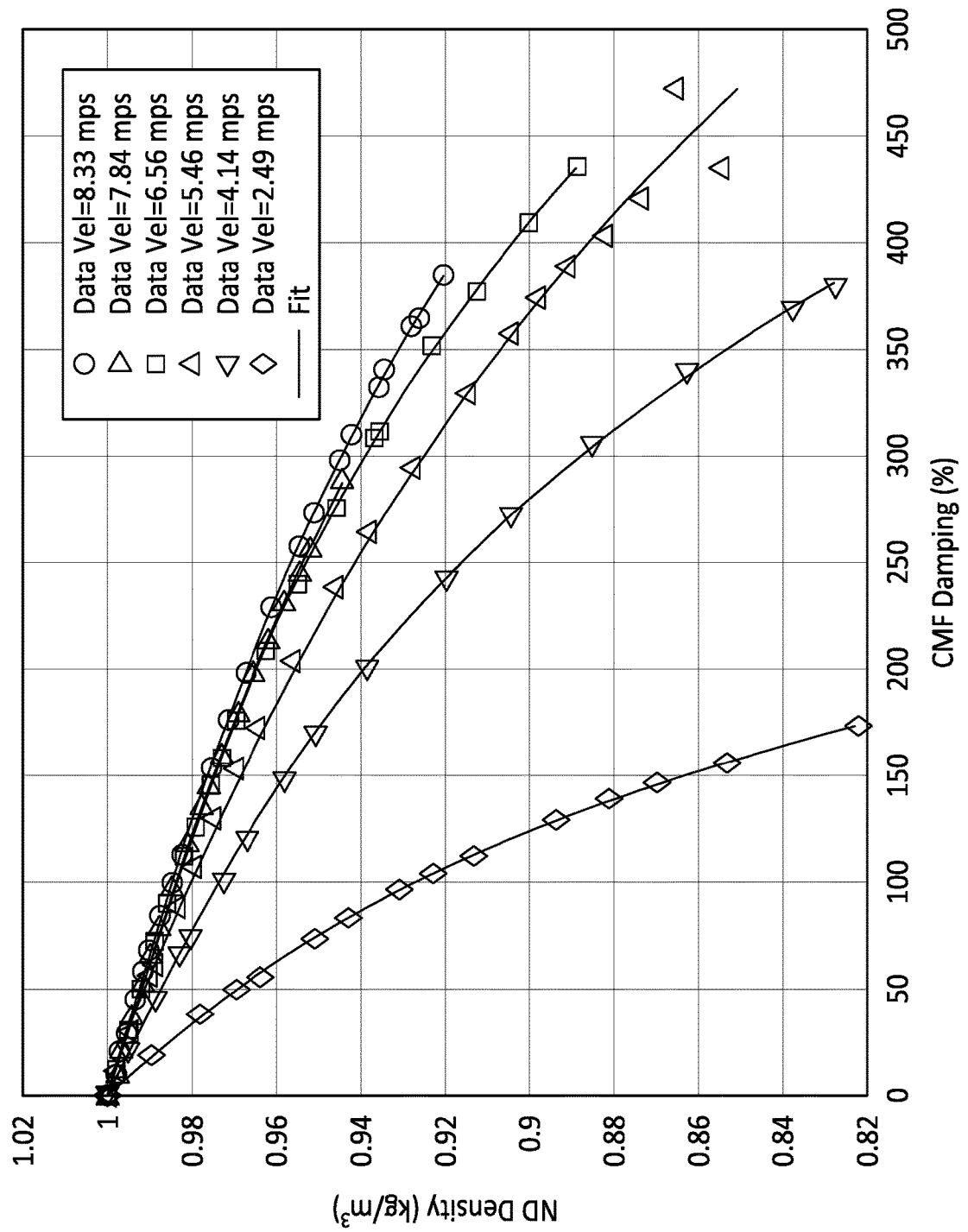
FIG. 10 is a graphical representation of the measured density and a parametric fit of the measured density versus CMF damping parameter for a Coriolis meter in accordance with the present disclosure.

FIG. 10 shows the measured density and a parametric fit of the measured density versus the offset adjusted CMF damping parameter for 6 data sets from Coriolis Meter B. The parametric fit utilizing liquid density, and linear and cubic terms for an offset corrected CMF Damping for Coriolis meter A operating over a range of nominal mixture velocities from 2.49 m/s to 8.33 m/s over a range of gas void fractions from 0% to 5%. As shown, the low order parametric fit captures relationship between the measured density and the offset adjusted CMF damping parameter the data quite well for each data set. The fit results in an optimized liquid density of ranging from 0.9994 to 1.0016 times the actual liquid density times the measured liquid density and with each of the 6 fits resulting in a coefficient of determination of >0.9996, indicating that the fit captures the data very well.

These results are summarized in Table 2. As shown in Table 2, the optimized density of the liquid phase, normalized by the actual density of the liquid phase of the bubbly liquid is shown to within 0.1% of unity. The coefficient of determination is also listed, showing that the three parameter fit of the data accurately represents the behavior of the measured density versus the offset-adjusted CMF damping parameter.

TABLE 2

| Coriolis Meter A ID = 1.06 in/ftube = 80 Hz | | | | | Coriolis Meter B ID = 1.10 in/ftube = 175 Hz | | | | |
|---|---|---|---|---|---|---|---|---|---|
| Vel Nom (m/s) | $\dfrac{\rho_{liq_{opt}}}{\rho_{liq_{act}}}$ | $\beta_{D_{1opt}}$ | $\beta_{D_{3opt}}$ | $R^2$ | Vel Nom (m/s) | $\dfrac{\rho_{liq_{opt}}}{\rho_{liq_{act}}}$ | $\beta_{D_{1opt}}$ | $\beta_{D_{3opt}}$ | $R^2$ |
| 8.93 | 0.9994 | −46.2 | 2.87 | 0.9995 | 8.33 | 0.9998 | −15.1 | −0.38 | 0.9998 |
| 8.47 | 0.9994 | −43.7 | 0.67 | 0.9998 | 7.84 | 0.9998 | −15.9 | −0.44 | 0.9996 |
| 7.04 | 0.9996 | −34.4 | 1.00 | 0.9999 | 6.56 | 0.9999 | −15.4 | −0.51 | 0.9999 |
| 5.87 | 1.0002 | −31.2 | −1.80 | 0.9999 | 5.46 | 1.0016 | −21.2 | −0.48 | 0.9899 |
| 4.50 | 1.0001 | −28.7 | −2.22 | 1.0000 | 4.14 | 0.9994 | −24.7 | −1.39 | 0.9998 |
| 2.66 | 0.9998 | −4.3 | −7.29 | 0.9999 | 2.49 | 0.9999 | −58.4 | −14.51 | 0.9998 |

It is important to note that each data set for which the measured density was fit as function of offset-adjusted CMF damping parameter, is comprised of data points which have the essentially the same, or materially similar, mixture velocities and reduced pressures. Thus, although the decoupling parameters for each data set are not known, nor are the relative importance of errors due to compressibility and decoupling, Hemp's reduced order model combined with Wood's Equation indicate that it is likely that these effects are quite similar for all the points within each data set. If the data was not grouped in data sets with similar mixture velocities and reduced pressures, the coefficient of determination of the parametric fits would be significantly reduced and the ability to extrapolate measured density as a function of offset-adjusted CMF damping parameter would be impaired.

Figure 11:
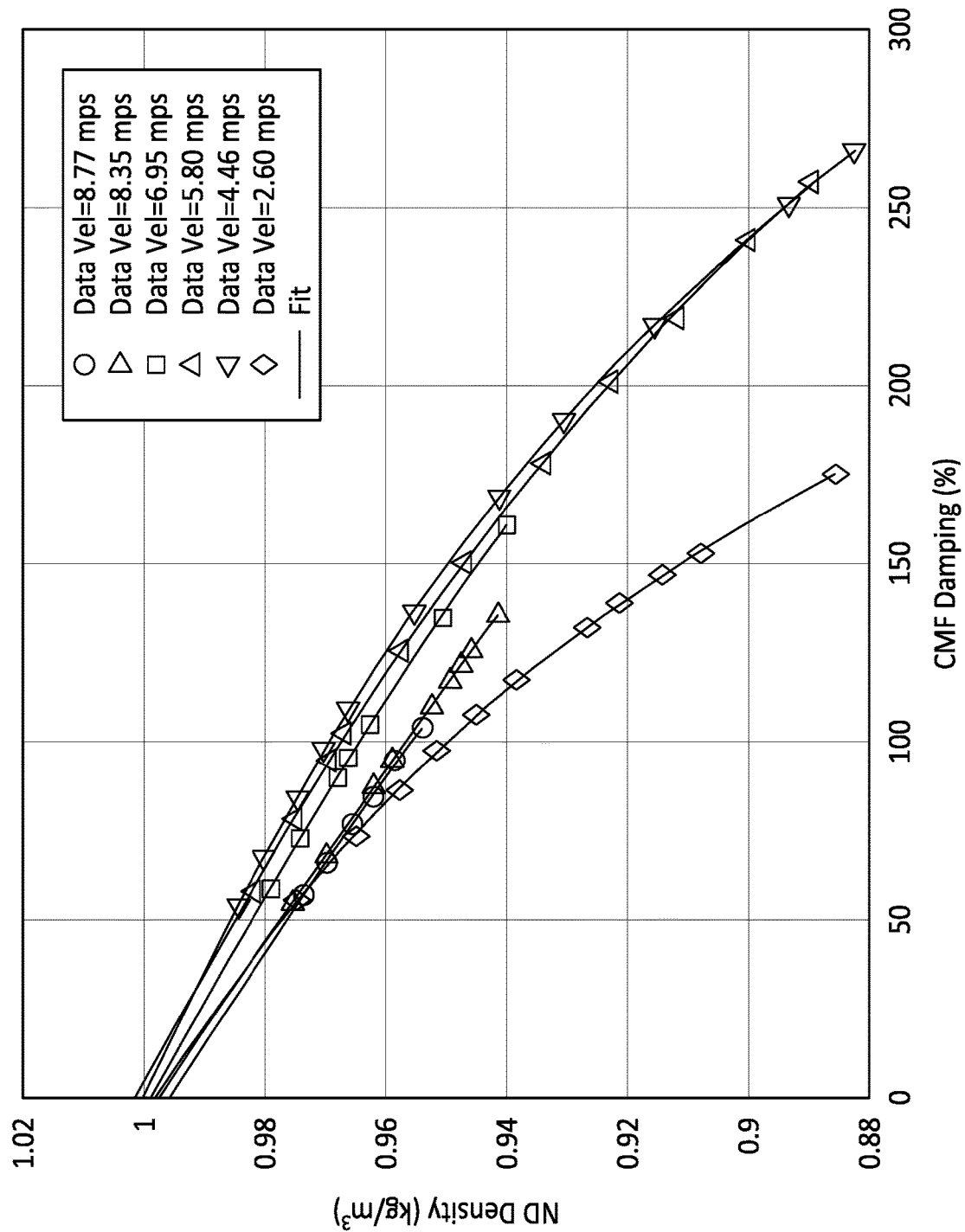
FIG. 11 is a graphical representation of the measured density and a parametric fit of the measured density versus CMF damping parameter for a Coriolis meter in accordance with the present disclosure.
Figure 12:
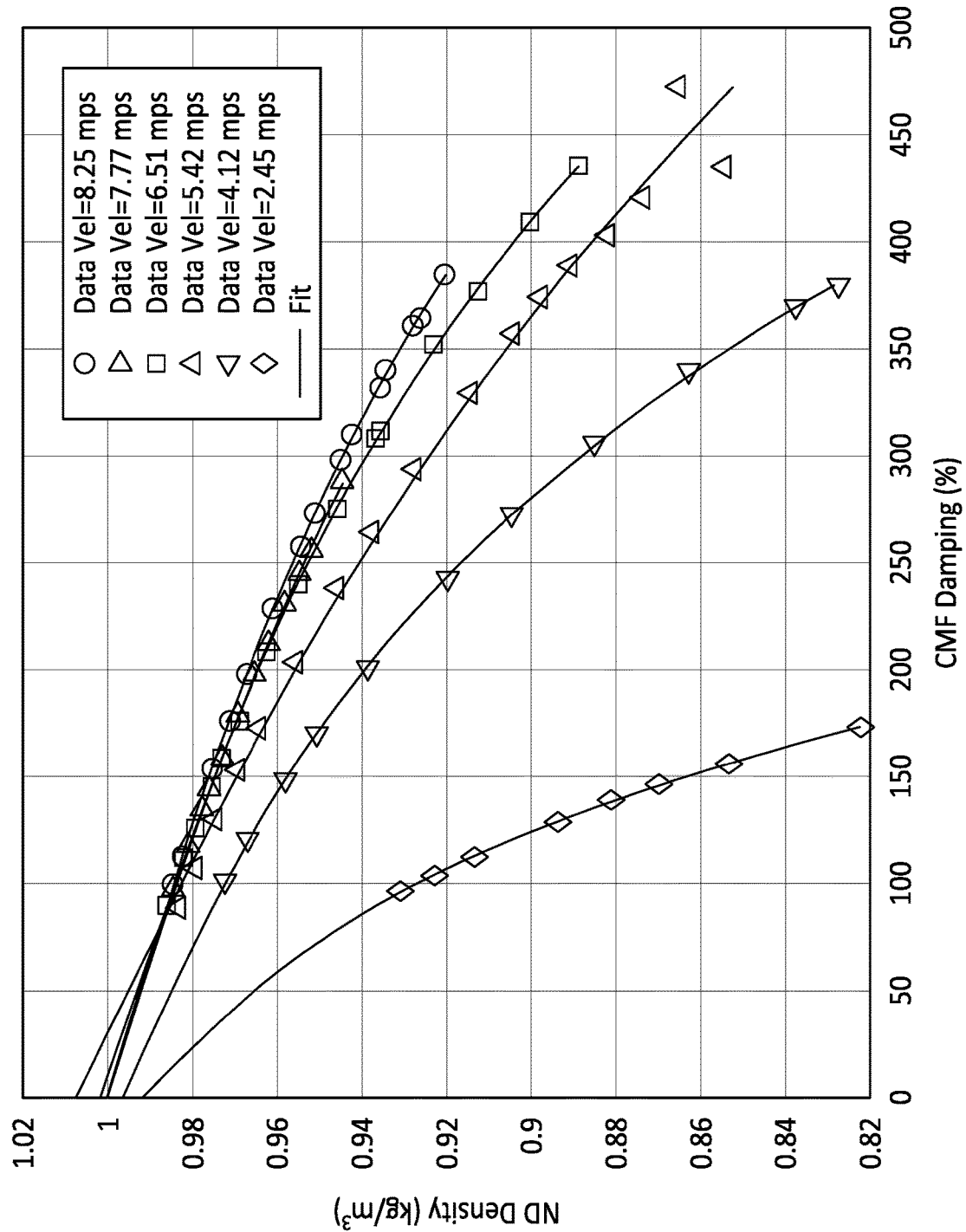
FIG. 12 is a graphical representation of the measured density and a parametric fit of the measured density versus CMF damping parameter for a Coriolis meter in accordance with the present disclosure.

It is recognized that a large part of the value in determining the density of a liquid phase of a bubbly mixture typically involves data for which the gas void fraction is always present. The ability of current invention to determine the liquid density of a bubbly liquids under these conditions is shown by restricting the data used in determining the density of the liquid phase to data points from which the offset-adjusted CMF damping value is above a set threshold. In this disclosure, and with reference to FIG. 11, data from Coriolis meter A was restricted to data points for which the offset-adjusted CMF damping parameter was >50%, and for Coriolis B, and with reference to FIG. 12, data was restricted to points for which the offset-adjusted CMF damping parameter was >90%. These minimum threshold levels were selected arbitrarily for demonstration purposes, and are intended to simulate operating conditions for which the density of the liquid phase is sought, however, only bubbly conditions are available for measurement. For example, this may be representative of a liquid outlet from a gas/liquid separator that fails to completely separate the gas and liquid phases and for which there is always some, albeit variably, amount of gas carry-under. The data for FIGS. 11 and 12 are summarized in Table 3.

As shown in Table 3 the optimized density of the liquid phase, normalized by the actual density of the liquid phase of the bubbly liquid. For Coriolis meter A, the average error of the 6 estimates of optimized liquid density was 0.13%, with a standard deviation of 0.20%. For Coriolis meter B, the average error of the 6 estimates of optimized liquid density was 0.07%, with a standard deviation of 0.52%. The coefficient of determination is also listed, showing that the three parameter fit of the data accurately represents the behavior of the measured density versus offset-adjusted CMF damping parameter.

TABLE 3

| Coriolis Meter A ID = 1.06 in/ftube = 80 Hz/EE > 50% | | | | | Coriolis Meter B ID = 1.10 in/ftube = 175 Hz/EE > 90% | | | | |
|---|---|---|---|---|---|---|---|---|---|
| Vel Nom (m/s) | $\dfrac{\rho_{liq_{opt}}}{\rho_{liq_{act}}}$ | $\beta_{D_{1opt}}$ | $\beta_{D_{3opt}}$ | $R^2$ | Vel Nom (m/s) | $\dfrac{\rho_{liq_{opt}}}{\rho_{liq_{act}}}$ | $\beta_{D_{1opt}}$ | $\beta_{D_{3opt}}$ | $R^2$ |
| 8.93 | 0.9959 | −38.5 | −1.07 | 0.9996 | 8.33 | 1.0000 | −15.3 | −0.37 | 0.9998 |
| 8.47 | 0.9976 | −40.3 | −0.56 | 1.0000 | 7.84 | 1.0016 | −17.3 | −0.31 | 0.9998 |
| 7.04 | 0.9991 | −33.4 | −1.24 | 0.9999 | 6.56 | 0.9999 | −15.8 | −0.51 | 0.9999 |
| 5.87 | 1.0015 | −32.5 | −1.66 | 0.9998 | 5.46 | 1.0069 | −24.2 | −0.38 | 0.9845 |
| 4.50 | 1.0002 | −28.6 | −2.21 | 1.0000 | 4.14 | 0.9962 | −22.5 | −1.49 | 0.9998 |
| 2.66 | 0.9982 | −40.5 | −7.73 | 0.9999 | 2.49 | 0.9914 | −48.0 | −16.46 | 0.9997 |

The ability to accurately determine the density of the liquid phase of bubbly mixtures utilizing only measured density and the offset-adjusted CMF damping parameter is surprising in general, and specifically it is surprising using only the measured density and the offset-adjusted CMF damping parameter using data from a Coriolis meter operating from which the majority of data points are operating with saturated excitation energy parameter is quite surprising and the level of precision demonstrated in determining the density of the liquid phase was improved by restricting the data to only include data points for which the readily available data for those data points indicate that the data points likely have similar errors due to decoupling and compressibility. Coriolis transmitters typically provide warning signals for operating points for which the excitation energy metric is above a given threshold to indicate that the data is mote reliable. For example, the Micro Motion 5700 transmitter indicates that the Coriolis meter is operating out of specification for EE above 70% of saturation.

The density of the liquid phase of a bubbly fluid is often sought under process conditions which contains significant variability in parameters such as gas void fraction, pressure, and mixture velocity over relatively short time scales even when the liquid density remains essentially constant over these short time scales. Often these variations in gas void fraction, pressure, and mixture velocity can occur in a random sequence. Another implementation of the current disclosure is to utilize readily available parameters which are known to affect the relationship between the density error parameter and offset-adjusted CMF damping to categorize data points into categories for which the relationship between the density error parameter and the offset-adjusted CMF damping is likely to be similar on a real time basis. Once categorized, data points from the same category, which may or may not be sequential temporarily, are used as input to an optimization process which utilizes the offset-adjusted CMF damping parameter and the measured density to determine an estimate of the process fluid density. Readily available parameters which affect the relationship between the density error parameter and the offset-adjusted CMF damping include but are not limited to reduced pressures and mixture velocities. As described above, the mixture velocity is well correlated with turbulence intensity and as such is well correlated with bubbly size, and therefore with the inverse Stokes number, and therefore with the effects of decoupling. Thus, bubbly mixtures made up of similar gases and liquids flowing at similar mixtures velocities through similar flow path geometries will likely have similar bubbly size distributions, similar inverse Stokes numbers and similar decoupling effects. Note that for bubbly mixtures, the measured mass flow and or the measured volumetric flow from a Coriolis meter are considered sufficiently accurate to be used as categorization variable.

Also developed above, reduced pressure impacts the relative errors due to decoupling and compressibility and will likely influence the relationship between offset-adjusted CMF damping parameter and density errors. For a given Coriolis meter operating on a bubbly mixture comprised of similar gases and liquids, the measured pressure is a suitable proxy for the reduced pressure. It is important to restrict data points used in optimization methods to determine the density of the liquid phase based on time varying, non-zero, offset-adjusted CMF Damping parameters, to data points for which the functional dependence of the offset-adjusted CMF damping versus density error is assumed to be similar.

mixture flow rate and gas void fraction were varied. Process conditions including mixture flow rate, pressure, and gas void fraction were varied by varying the rate at which air was injected into single phase water upstream of the Coriolis meter and varying the area of a back pressure valve downstream of the Coriolis meter. The flow was driven by a nominally constant speed centrifugal pump.

A mixture velocity was estimated for each 1 sec data point by dividing the mass flow measured by the Coriolis meter by the density measured by the Coriolis meter. The mixture velocities ranged from ~3 meters/sec to ~7 meters/sec, and the pressures ranged from ~20 psia to 40 psia. This experimental setup ensured that the pressure and mixture velocity were well-correlated, such that groups of date points with the similar mixture velocities also has similar pressures, avoiding the need to sort the data in term of both mixture flow rate and process pressure (or reduced pressure).

The data points were sorted into 10 bins based on the measured mixture velocity. It should be appreciated by those skilled in the art that the terms "bin" or "bins" can be synonymous with the terms "group" and "groups" and refers to respective groupings of data points having respective similar values. It is noted that the data points could also have been sorted based on a measured or corrected mass flow, or any other parameter indicative of the mixture velocity. The excitation energy metric for single phase flow conditions was determined to be 0.02 for this Coriolis meter operating on the liquid only phase. The density of the liquid phase was measured to be 999.72 kg/m^3. Data points for which the offset-adjusted CMF Damping parameter was below 50% were removed from the data set prior to utilizing the data set to estimate the density of the liquid phase. The measured mixture density for each group was first fitted as a linear function of offset-adjusted CMF damping parameter, with the y-intercept of the linear fit representing an optimized estimate of the liquid density. The error of the fit for each data point was then determined and any points with an error greater than 1 standard deviation of all of the errors within a bin were removed from the data set, and the remaining data within the bin was fitted again with a linear fit.

It is also noted that other restrictions on the data points used in an optimization model to determine an estimate of

TABLE 4

| Bin Number | Center of Bin (m/s) | Width of Bin (m/s) | Data Points in Bin | Average measured Density (kg/m^3) | Average CMF Damping | Standard Deviation of CMF Damping | Standard Deviation/ Average CMF Damping | Optimized Liquid Density | Optimized Sloped of Density vs CMF Damping | Average Error in Measured Liquid Density | Error in Optimized Liquid Density |
|---|---|---|---|---|---|---|---|---|---|---|---|
| 1 | 2.77 | 0.28 | 14 | 941.6 | 1.261 | 0.0624 | 0.049 | 1020.6 | −63.1 | −5.81% | 2.08% |
| 2 | 3.07 | 0.31 | 10 | 961.2 | 0.999 | 0.1636 | 0.164 | 1006.8 | −45.3 | −3.85% | 0.71% |
| 3 | 3.39 | 0.34 | 5 | 963.4 | 0.962 | 0.3254 | 0.338 | 1010.8 | −49.8 | −3.63% | 1.10% |
| 4 | 3.76 | 0.38 | 6 | 967.4 | 0.914 | 0.2958 | 0.324 | 1000.0 | −35.0 | −3.24% | 0.02% |
| 5 | 4.16 | 0.42 | 9 | 974.5 | 0.784 | 0.1994 | 0.254 | 1003.4 | −36.2 | −2.52% | 0.37% |
| 6 | 4.60 | 0.46 | 10 | 978.0 | 0.677 | 0.1133 | 0.167 | 1003.2 | −36.7 | −2.17% | 0.35% |
| 7 | 5.09 | 0.51 | 9 | 975.1 | 0.793 | 0.1438 | 0.181 | 1001.0 | −32.8 | −2.46% | 0.13% |
| 8 | 5.63 | 0.57 | 18 | 968.7 | 0.949 | 0.2457 | 0.259 | 1000.8 | −33.9 | −3.10% | 0.11% |
| 9 | 6.23 | 0.63 | 7 | 965.7 | 0.976 | 0.2718 | 0.278 | 1002.4 | −37.3 | −3.40% | 0.27% |
| 10 | 6.89 | 0.70 | 43 | 960.3 | 1.069 | 0.3004 | 0.281 | 1000.2 | −37.2 | −3.95% | 0.04% |

Table 4 shows the results of an optimization model to determine the density of the liquid phase of a range of bubbly water and air mixtures. The measured mass flow, density, excitation energy, and vibration amplitude from a modern 2 inch Coriolis meter (Coriolis meter A) was recorded each second over a 3-minute period over which the density of the liquid phase of a bubbly mixture can be employed to help ensure that all of the points with the data group have a similar correlation among the measured density, an offset-adjusted CMF Damping parameter, and the liquid density. For example, only points for which the offset-adjusted CMF Damping parameter is below a given threshold value could be used to exclude points for which the Coriolis measurements are not considered sufficiently reliable.

Figure 13:
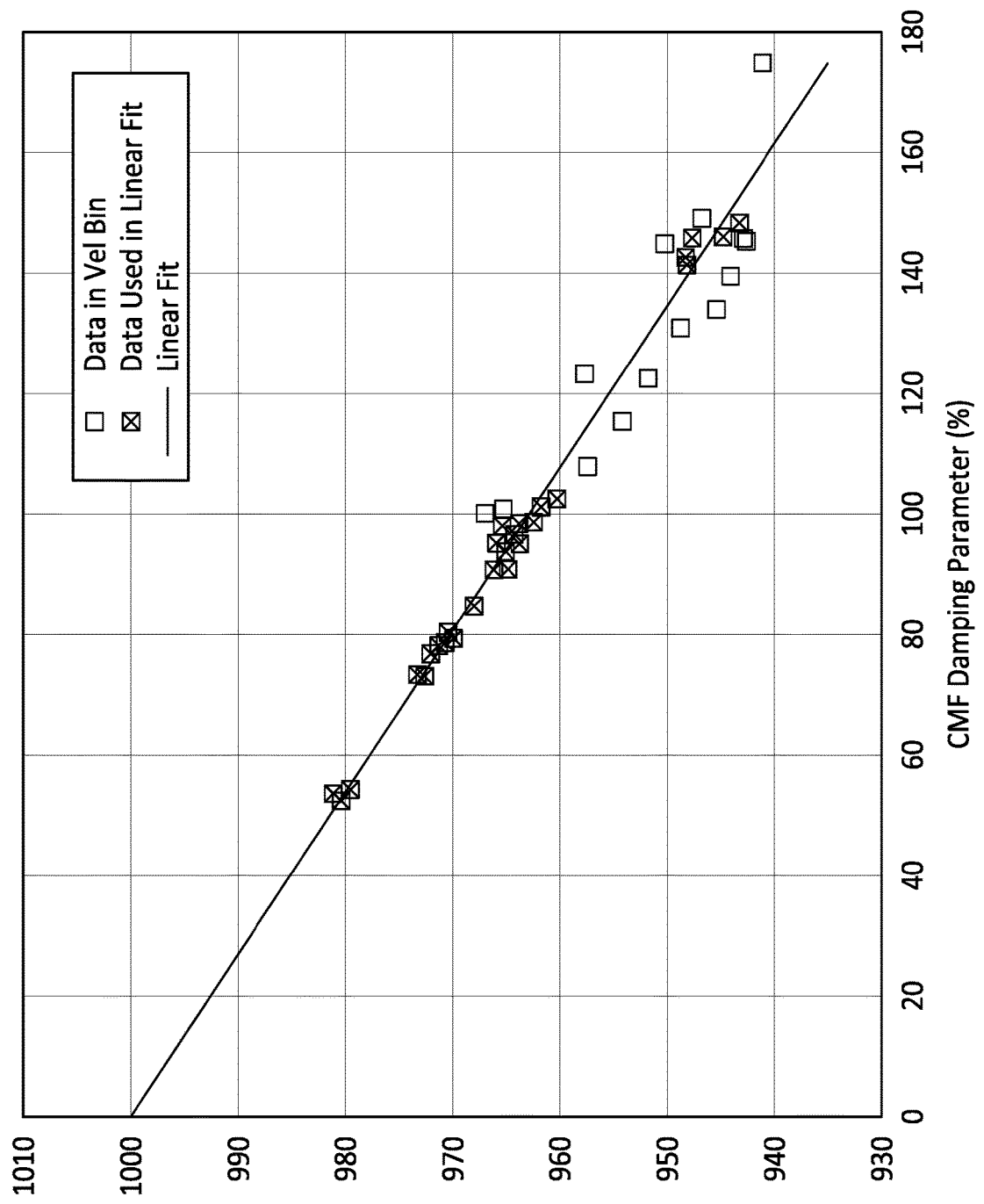
FIG. 13 is a graphical representation of the of Linear fit of measured density versus CMF Damping Parameter for a Coriolis meter in accordance with the present disclosure.

FIG. 13 shows an example of Linear fit of measured density versus offset-adjusted CMF Damping Parameter for the set of data points in bin number 10 with a center of the bin at 6.89 m/sec. All of the original data points are shown, and then the data points in the final linear fit are indicated, as is the final linear fit.

Table 4 shows the results of the procedure described above applied to each of the 10 data groups grouped by mixture velocity. As shown in Table 4, the error in the optimized liquid density estimated from each bin is significantly reduced compared to the measured density. In addition to utilizing an optimized estimate from any one of the bins there are several other methods to provide an improved estimate of the liquid density utilizing the methods disclosed herein.

For example, a weighted average of the optimized liquid densities from each bin can be determined to provide an improved estimate of the liquid density. One example of this utilizes the ratio of the standard deviation of the offset-adjusted CMF damping parameter for the data points within each bin to the mean value of the CMF damping parameter for the data points within each bin multiplied by the number of data points in each bin. This weighting methodology weights bins with greater variation in offset-adjusted CMF Damping and with lower average values of offset-adjusted CMF Damping over other bins with a lower ratio of standard deviation in offset-adjusted CMF Damping over average value of offset-adjusted CMF damping. This example also includes a weighted contribution of weighting by the number of points in each bin:

$$\rho_{liq_{opt}} = \frac{\sum_{i_{bin}=1}^{N_{bins}} \frac{stdev(D_{CFM})_{i_{bin}}}{average(D_{CFM})_{i_{bin}}} Npts_{i_{bin}} \rho_{liq_{i_{bin}}}}{\sum_{i_{bin}=1}^{N_{bins}} \frac{stdev(D_{CFM})_{i_{bin}}}{average(D_{CFM})_{i_{bin}}} Npts_{i_{bin}}}$$ (Equation 15)

Where $\rho_{liq_{opt}}$ is the optimized density of the liquid phase, $stdev(D_{CFM})_{i_{bin}}$ is the standard deviation of the $D_{CFM}$ for the $i_{bin}{}^{th}$ "bin" or group, $average(D_{CFM})_{i_{bin}}$ is the average $D_{CFM}$ for the $i_{bin}{}^{th}$ "bin" or group, $Npts_{i_{bin}}$ is the number of point in the $i_{bin}{}^{th}$ "bin" or group, $\rho_{liq_{i_{bin}}}$ is the optimized density of the liquid phase from the $i_{bin}{}^{th}$ "bin" or group. Applying the weighting methodology described above to the example data set results in an error of 0.25% in the estimated density of the liquid phase based on interpreting the offset-adjusted CMF damping parameter over the three minutes of randomly varying flow rate and pressures. For data sets for which the pressure and mixture velocity is not monotonically correlated, the data should be sorted into bins of like mixture velocities and like pressures.

Furthermore, the methodology developed in the disclosure differs from prior art in which changing in a CMF damping parameter were assumed to be related to either changes in compressibility (Zhu) or change in decoupling (Basse). The methodology presented herein has been shown to be sufficiently general to address various combinations of the effects associated with compressibility, decoupling, and any other sources of error in the measured density.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated other The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

While the foregoing is directed to embodiments of the present disclosure, other and further embodiments of the disclosure may be devised without departing from the basic scope thereof, and the scope thereof is determined by the claims that follow.

What is claimed is:

1. A method of using a Coriolis meter comprising:
    measuring a fluid density of a process fluid using a vibrational frequency of a fluid-conveying flow tube of the Coriolis meter, wherein a density of a liquid phase of the process fluid is unknown;
    measuring at least one of an excitation energy metric of the Coriolis meter and a vibrational amplitude metric of the Coriolis meter;
    determining a Coriolis Mass Flowmeter Damping (CMFD) parameter using at least one of the excitation energy metric and the vibrational amplitude metric; and
    determining the density of the liquid phase of the process fluid using the measured fluid density and the CMFD parameter; and
    wherein the determining the density of the liquid phase comprises measuring the measured fluid density of the process fluid and determining the CMFD at a plurality of instances of time over which the CMFD parameter varies.

2. The method of claim 1, wherein determining the density of the liquid phase of the process fluid comprises using an optimization model, wherein the optimization model utilizes the fluid density and the CMFD parameter at the plurality of instances of time over which the CMFD parameter varies to determine an optimized estimate of the density of the liquid phase of the process fluid.

3. The method of claim 2 further comprising:
    measuring one or more additional parameters of the process fluid indicative of the process fluid at the plurality of instances of time;

utilizing the one or more additional parameters of the process fluid to categorize the plurality of instances of time into one or more respective groups, wherein one or more of the respective parameters of the process fluid are substantially equal; and determining an optimized estimate of the density of the liquid phase using the optimization model on at least one of the respective groups.

4. The method of claim 3, wherein the one of more additional parameters is a parameter indicative of a mixture velocity, the method further comprising:

producing a plurality of mixture velocities at the plurality of instances of time; and sorting the mixture velocity at the plurality of instances of time into the respective groups based on respective mixture velocities.

5. The method of claim 3, wherein the one or more additional parameters includes a process parameter indicative of the mixture velocity and a process parameter indicative of a process pressure, the method further comprising:

sorting the plurality of instances of time into one or more of the respective groups, wherein the process parameters indicative of the mixture velocity are substantially equal and the process parameters indicative of the process pressure are substantially equal.

6. The method of claim 3, wherein the optimized estimate of the density of the liquid phase of the process fluid comprises determining a respective optimized liquid density for each of the respective groups and applying a respective weighting factor to each of the respective optimized liquid densities to determine the optimized estimate of the density of the liquid phase based on a weighted contribution from one or more respective groups.

7. The method of claim 6, wherein the respective weighting factor comprises a ratio of the standard deviation of the CMFD parameter within the respective group to the mean value of the CMFD parameter within the respective group multiplied by the number of mixture velocities in the respective group.

8. The method of claim 2, further comprising:

applying a minimum required value for the vibration amplitude for the pluralities of instances in the optimization model to determine the density of the liquid phase based on the measured fluid density and a determined CMFD at a plurality of instances of time.

9. The method of claim 1, wherein the CMFD is the ratio of the excitation energy metric to the vibrational amplitude metric.

10. The method of claim 1, wherein the CMFD is the ratio of an offset-adjusted excitation energy metric and a vibration amplitude metric.

11. A system for using a Coriolis meter comprising:
one or more processors configured to:
measure a fluid density of a process fluid using a vibrational frequency of a fluid-conveying flow tube of the Coriolis meter, wherein a density of a liquid phase of the process fluid is unknown;
measure at least one of an excitation energy metric of the Coriolis meter and a vibrational amplitude metric of the Coriolis meter;
determine a Coriolis Mass Flowmeter Damping (CMFD) parameter using at least one of the excitation energy metric and the vibrational amplitude metric; and
determine the density of the liquid phase of the process fluid using the measured fluid density and the CMFD parameter; and wherein the determining the density of the liquid phase comprises measure the measured fluid density of the process fluid and determining the CMFD at a plurality of instances of time over which the CMFD parameter varies.

12. The system of claim 11, wherein determining the density of the liquid phase of the process fluid comprises using an optimization model, wherein the optimization model utilizes the fluid density and the CMFD parameter at the plurality of instances of time over which the CMFD parameter varies to determine an optimized estimate of the density of the liquid phase of the process fluid.

13. The system of claim 12, further comprising:

measuring one or more additional parameters of the process fluid indicative of the process fluid at the plurality of instances of time;

utilizing the one or more additional parameters of the process fluid to categorize the plurality of instances of time into one or more respective groups, wherein one or more of the respective parameters of the process fluid are substantially equal; and determining an optimized estimate of the density of the liquid phase using the optimization model on at least one of the respective groups.

14. The system of claim 13, wherein the one of more additional parameters is a parameter indicative of a mixture velocity, the method further comprising:

producing a plurality of mixture velocities at the plurality of instances of time; and sorting the mixture velocity at the plurality of instances of time into the respective groups based on respective mixture velocities.

15. The system of claim 13, wherein the one or more additional parameters includes a process parameter indicative of the mixture velocity and a process parameter indicative of a process pressure, the method further comprising:

sorting the plurality of instances of time into one or more of the respective groups, wherein the process parameters indicative of the mixture velocity are substantially equal and the process parameters indicative of the process pressure are substantially equal.

16. The system of claim 13, wherein the optimized estimate of the density of the liquid phase of the process fluid comprises determining a respective optimized liquid density for each of the respective groups and applying a respective weighting factor to each of the respective optimized liquid densities to determine the optimized estimate of the density of the liquid phase based on a weighted contribution from one or more respective groups.

17. The system of claim 16, wherein the respective weighting factor comprises a ratio of the standard deviation of the CMFD parameter within the respective group to the mean value of the CMFD parameter within the respective group multiplied by the number of mixture velocities in the respective group.

18. The system of claim 12, further comprising:

applying a minimum required value for the vibration amplitude for the plurality of instances of time in the optimization model to determine the density of the liquid phase based on the measured fluid density and a determined CMFD at a plurality of instances of time.

19. The system of claim 11, wherein the CMFD is the ratio of the excitation energy metric to the vibrational amplitude metric.

20. The system of claim 11, wherein the CMFD is the ratio of an offset-adjusted excitation energy metric and a vibration amplitude metric.

* * * * *